US012192008B2

(12) United States Patent
Di Girolamo et al.

(10) Patent No.: US 12,192,008 B2
(45) Date of Patent: Jan. 7, 2025

(54) 5G MULTICAST-BROADCAST SERVICES (MBS) MULTIPLEXING, RELIABILITY, AND POWER SAVINGS

(71) Applicant: InterDigital Patent Holdings, Inc., Wilmington, DE (US)

(72) Inventors: Rocco Di Girolamo, Laval (CA); Pascal Adjakple, Great Neck, NY (US); Yifan Li, Conshohocken, PA (US); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/759,378

(22) Filed: Jun. 28, 2024

(65) Prior Publication Data

US 2024/0356680 A1  Oct. 24, 2024

Related U.S. Application Data

(63) Continuation of application No. 18/552,999, filed as application No. PCT/US2022/022870 on Mar. 31, 2022.

(60) Provisional application No. 63/185,726, filed on May 7, 2021, provisional application No. 63/168,710, filed on Mar. 31, 2021.

(51) Int. Cl.
*H04L 1/1822* (2023.01)
*H04W 4/06* (2009.01)

(52) U.S. Cl.
CPC ............. *H04L 1/1822* (2013.01); *H04W 4/06* (2013.01)

(58) Field of Classification Search
CPC .............................. H04W 4/06; H04L 1/1822
See application file for complete search history.

(56) References Cited

U.S. PATENT DOCUMENTS 11,811,691 B1 * 11/2023 Babaei .................. H04W 72/30
2018/0206289 A1    7/2018 Kim et al.

OTHER PUBLICATIONS

3rd Generation Partnership Project; Technical Specification Group Radio Access Network; Evolved Universal Terrestrial Radio Access (E-UTRA) and NR; Multiconnectivity; Stage 2 (Release 16); 3GPP TS 37.340 V16.4.0; Dec. 2020, pp. 1-84.

(Continued)

*Primary Examiner* — Rhonda L Murphy
(74) *Attorney, Agent, or Firm* — Flaster Greenberg P.C.

(57) ABSTRACT

Methods and apparatuses are described herein for Multicast/Broadcast Services (MBS). The embodiments described herein are directed to procedures for managing multiplexed MBS traffic, for prioritization between MBS related UL traffic, unicast UL traffic, and SL traffic, for handling HARQ retransmissions over C-RNTI, to support PDCP Status Reporting for MBS services, and for a wireless transmit/receive unit (WTRU) joining already started/activated Multicast Sessions. In one example, a WTRU may receive multiplexed MBS services via one or more MBS radio bearers (MRB) and/or one or more unicast data radio bearers (DRBs). The WTRU may be configured with a single Service Data Adaptation Protocol (SDAP) entity for the MBS services, and demultiplexing of traffic may be performed at the SDAP layer. The WTRU may be configured to demultiplex multiple logical channels across different MBS services, where the logical channels are received over the same transport block.

20 Claims, 19 Drawing Sheets

(56) References Cited

OTHER PUBLICATIONS

3rd Generation Partnership Project; Technical Specification Group Radio Access Network; NR; NR and NG-RAN Overall Description; Stage 2 (Release 16); 3GPP TS 38.300 V16.4.0; Jan. 2021, pp. 1-149.

3rd Generation Partnership Project; Technical Specification Group Radio Access Network; NR; Radio Resource Control (RRC) protocol specification (Release 16); 3GPP TS 38.331 V16.3.1; Jan. 2021, pp. 1-932.

CATT, "Discussion on other issues for MBS", vol. {0} RAN WG1, No. {0} e-Meeting; Jan. 25, 2020-Feb. 5, 2020, Jan. 19, 2021 (Jan. 19, 2021), 3GPP Draft; R1-2100357, 3rd Generation Partnership Project (3GPP), Mobile Competence Centre ; 650, Route Des Lucioles ; F-06921 Sophia-Antipolis Cedex ; France Retrieved from the Internet:URL:https://ftp.3gpp.org/tsg_ran/WG1_RL1/TSGR1_104-e/Docs/R1-2100357.zip R1-2100357.docx XP051970960 [retrieved on Jan. 19, 2021] pp. 1-2.

OPPO, "Discussion on group-based scheduling for MBS", vol. {0} RAN WG2, No. {0} electronic; Nov. 2, 2020-Nov. 13, 2020, Oct. 23, 2020 (Oct. 23, 2020), 3GPP Draft; R2-2008874, 3rd Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/tsg_ran/WG2_RL2/TSGR2_112-e/Docs/R2-2008874.zip R2-2008874—Discussion on group based scheduling for MBS.doc XP051941953 [retrieved on Oct. 23, 2020] pp. 3-4.

VIVO, "Group Scheduling for MBS", vol. {0} RAN WG2, No. {0} electronic; Jan. 25, 2021-Feb. 5, 2021, Jan. 15, 2021 (Jan. 15, 2021), 3GPP Draft; R2-2100836, 3rd Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/tsg_ran/WG2_RL2/TSGR2 113-e/Docs/R2-2100836.zip R2-2100836 Group Scheduling for MBS.doc XP051973933 [retrieved on Jan. 15, 2021] pp. 2-6.

* cited by examiner

5G MULTICAST-BROADCAST SERVICES (MBS) MULTIPLEXING, RELIABILITY, AND POWER SAVINGS

This application is a Continuation of U.S. patent application Ser. No. 18/552,999, filed Sep. 28, 2023, which is the National Stage Application of International Patent Application No. PCT/US2022/022870, filed Mar. 31, 2022, which claims the benefit of U.S. Provisional Patent Application No. 63/168,710, filed Mar. 31, 2021, and U.S. Provisional Patent Application No. 63/185,726, filed May 7, 2021, which are hereby incorporated by reference in their entirety.

BACKGROUND

Multicast/Broadcast Services (MBS) may be offered over New Radio (NR) and are intended to have various QoS requirements. The delivery of this traffic to the interested UEs is intended to be very flexible and to also be adaptable. The network may be capable of dynamically changing how the traffic is delivered to a UE. However, this flexibility and the varied QoS requirements that are expected to be supported leads to a number of problems with efficiently transmitting this MBS traffic. MBS experience problems in dealing with how to configure the MBS radio bearers for the service, how to efficiently multiplex MBS services, how to improve the reliability of MBS transmissions, and how to deal with starting reception of an MBS service that is already being received by other UEs. Accordingly, there is a need for improved MBS techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for Multicast/Broadcast Services (MBS). The embodiments described herein are directed to procedures for managing multiplexed MBS traffic, for prioritization between MBS related UL traffic, unicast UL traffic, and SL traffic, for handling HARQ retransmissions over a cell radio network temporary identifier (C-RNTI), to support PDCP Status Reporting for MBS services, and for a wireless transmit/receive unit (WTRU) joining already started/activated Multicast Sessions. In one example, a WTRU may receive multiplexed MBS services via one or more MBS radio bearers (MRB) and/or one or more unicast data radio bearers (DRBs). The WTRU may be configured with a single Service Data Adaptation Protocol (SDAP) entity for the MBS services, and demultiplexing of traffic may be performed at the SDAP layer. The SDAP entity may demultiplex multiple MBS quality of service (QoS) flows across different MBS services. The WTRU may demultiplex traffic at the MAC layer. The WTRU may be configured to demultiplex multiple logical channels across different MBS services, where the logical channels are received over the same transport block.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1A:
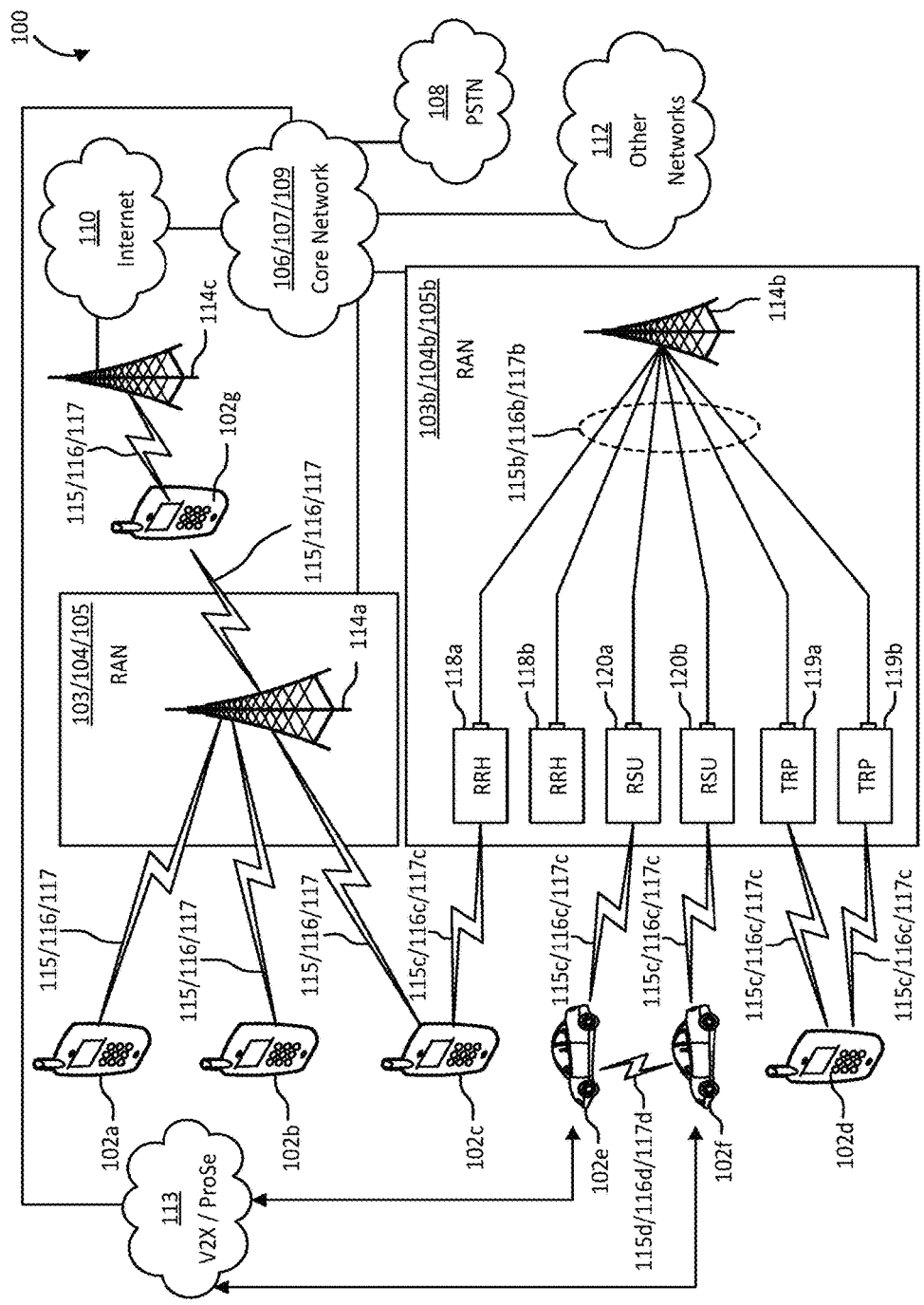
FIG. 1A illustrates one embodiment of an example communications system in which the methods and apparatuses described and claimed herein may be embodied.

Methods and apparatuses are described herein for Multicast/Broadcast Services (MBS). The techniques described herein may be described as being performed in a UE or gNB for illustrative purposes, but the techniques described herein may be performed by any type of apparatus or device configured to operate and/or communicate in a wireless environment, including but not limited to a WTRU or a base station.

The following abbreviations and definitions may be used herein:

5QI 5G QoS Identifier
AM Acknowledged Mode
ARQ Automatic Repeat reQuest
BM-SC Broadcast Multicast Service Centre
CRC Cyclic Redundancy Check
DCI Downlink Control Information
DL Downlink
DL SCH DL Shared Channel
DRB Data Radio Bearer (unicast)
DRX Discontinuous Reception
eMBB enhanced Mobile Broadband
eMTC enhanced Machine-Type Communication eNB E-UTRAN NodeB
gNB NR Node B
G-RNTI Group RNTI
GBR Guaranteed Bit Rate
GW Gateway
HARQ Hybrid ARQ
IoT Internet-of-Things
ITS Intelligent Transport System
L2 Layer 2
LTE Long Term Evolution
MAC Medium Access Control
MBMS Multicast/Broadcast Multimedia services
MBS Multicast/Broadcast Service
MBSFN Multicast Broadcast Single Frequency Network
MCE Multi-cell/multicast Coordination Entity
MCH Multicast Transport Channel
mMTC Massive Machine-Type Communication
MooD MBMS operation on Demand
MRB MBS radio bearer
MTCH Multicast Traffic Channel
NB-IoT Narrow Band-IoT
NR New Radio
PDCP Packet Data Convergence Protocol
PDCCH Physical Downlink Control CHannel
PDSCH Physical Downlink Shared CHannel
PMCH Physical Multicast Channel
PTP Point-to-Point
PTM Point-to-Multipoint
QoS or QOS Quality of Service
RAN Radio Access Node
RLC Radio Link Control
RoHC Robust Header Compression
ROM Receive-only-Mode
RSRP Reference Signal Received Power
SC Single-Cell
SDAP Service Data Adaptation Protocol
SL SideLink
TB Transport Block
UCI Uplink Control Information
UE User Equipment
UM Unacknowledged Mode
URLLC Ultra Reliable Low Latency Communication
V2X Vehicle-to-Everything The following terms are used herein:

Multicast Service: A unidirectional point-to-multipoint service in which data is efficiently transmitted from a single source to a multicast group in the associated multicast service area. Multicast services can only be received by such users that are subscribed to the specific multicast service and have joined the multicast group associated with the specific service.

Broadcast Service: A unidirectional point-to-multipoint service in which data is efficiently transmitted from a single source to multiple UEs in the associated broadcast service area. Broadcast services may be received by all users who have enabled the specific broadcast service locally on their UE and who are in the broadcast area defined for the service.

PTP: A term used in the radio access network to denote a case that the over the air transmissions are from a single RAN node to a single UE.

PTM: A term used in the radio access network to denote a case that the over-the-air transmissions are from a single RAN node to multiple UEs. PTM transmissions from multiple cells may be combined to create a Multi-Cell PTM transmission MBS Session: The core network delivery mechanism for a MBS service Multicast Session: The core network delivery mechanism for a multicast session Broadcast Session: The core network delivery mechanism for a broadcast session MBS Radio bearer: a radio bearer for MBS traffic. The MBS radio bearer may be of split bearer type, with a PTP leg/path and a PTM leg/path. Alternatively, an MBS radio bearer may be a non-split bearer of PTM type.

Split Bearer: a type of radio bearer that has two legs/paths. In the context of MBS, one of these legs is a PTP leg, while the other is a PTM leg. The anchor of the split bearer may be at different layers: SDAP, PDCP, RLC, MAC.

Group RNTI: an RNTI that is destined for a group of UEs. May also be referred to as a group-common RNTI PTP Path or PTP leg: One leg of a split bearer, where the transport block is transmitted to a single UE using a C-RNTI PTM Path of PTM leg: One leg of a split bearer, where the transport block is transmitted to a number of UEs, all sharing the same G-RNTI.

PTP Transmission: gNB individually delivers separate copies of MBS data packets to each UEs independently, i.e. gNB uses UE-specific PDCCH with CRC scrambled by UE-specific RNTI (e.g., C-RNTI) to schedule UE-specific PDSCH which is scrambled with the same UE-specific RNTI.

PTM Transmission: gNB delivers a single copy of MBS data packets to a set of UEs, i.e., gNB uses group-common PDCCH with CRC scrambled by group-common RNTI to schedule group-common PDSCH which is scrambled with the same group-common RNTI.

MBS transmissions: Transmissions of MBS services.
Unicast transmissions: Transmissions of unicast services.
MBS group: A group of UEs that receive MBS transmission and share a G-RNTI.

LTE MBMS Overview and Limitations

Multicast/Broadcast Multimedia services (MBMS) are characterized by the distribution of common interest content, from one source entity to a number of receive entities that are interested in the service. Mobile networks are primarily designed for unicast services, and as a result not optimized for multicast/broadcast services. Providing multicast/broadcast services therefore requires optimizations in how the traffic from these services is transported over the core network and over the radio access network.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHZ, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHZ, with cm Wave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (cV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Each of the WTRUs 102a, 102b, 102c, 102d, 102e, 102f, 102g may be configured to perform any of the methods described herein. Although each WTRU 102a, 102b, 102c, 102d, 102e, 102f, 102g is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102c, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102c, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VOIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
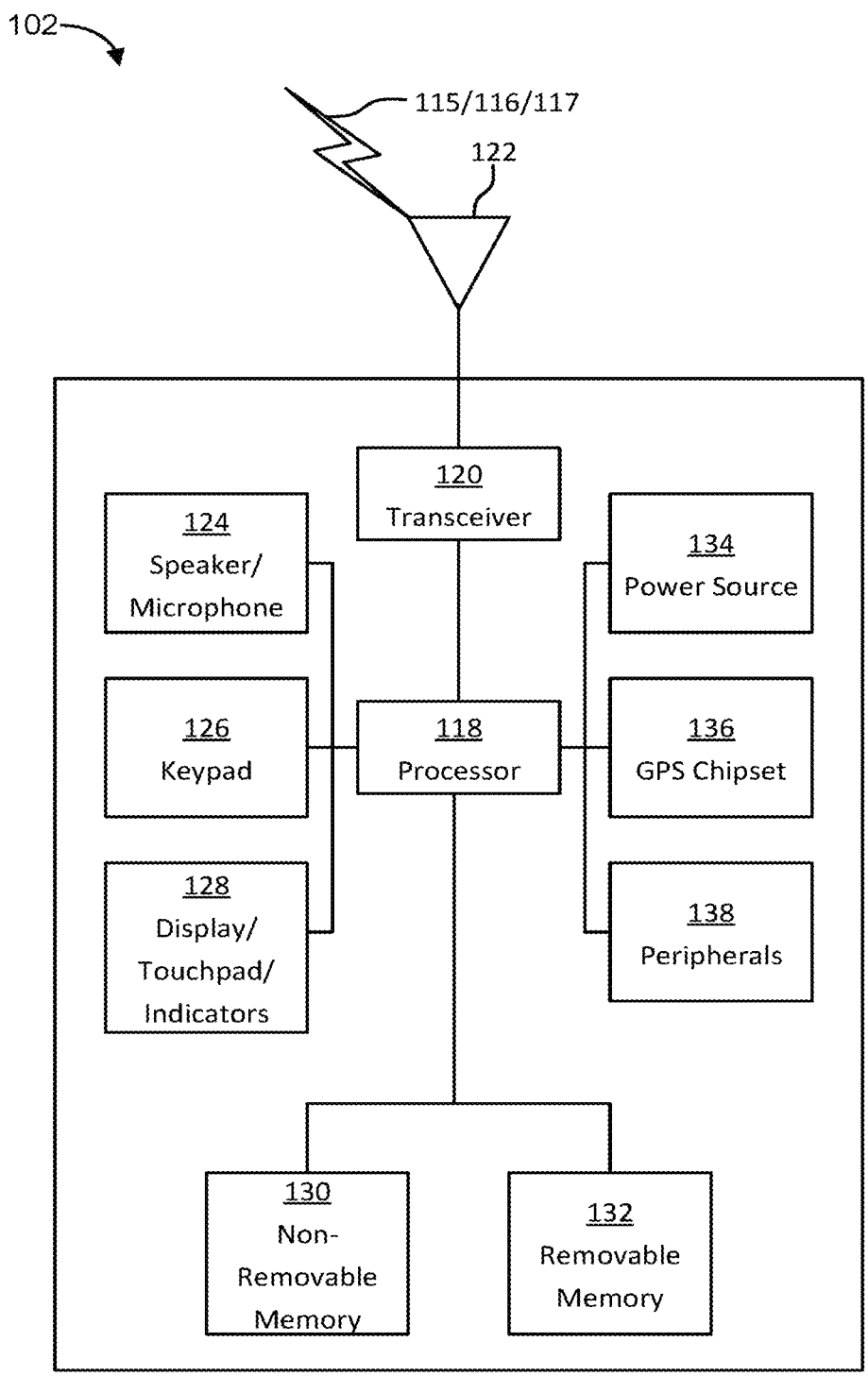
FIG. 1B is a block diagram of an example apparatus or device configured for wireless communications in accordance with the embodiments illustrated herein, such as for example, a wireless transmit/receive unit (WTRU)

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit).

The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
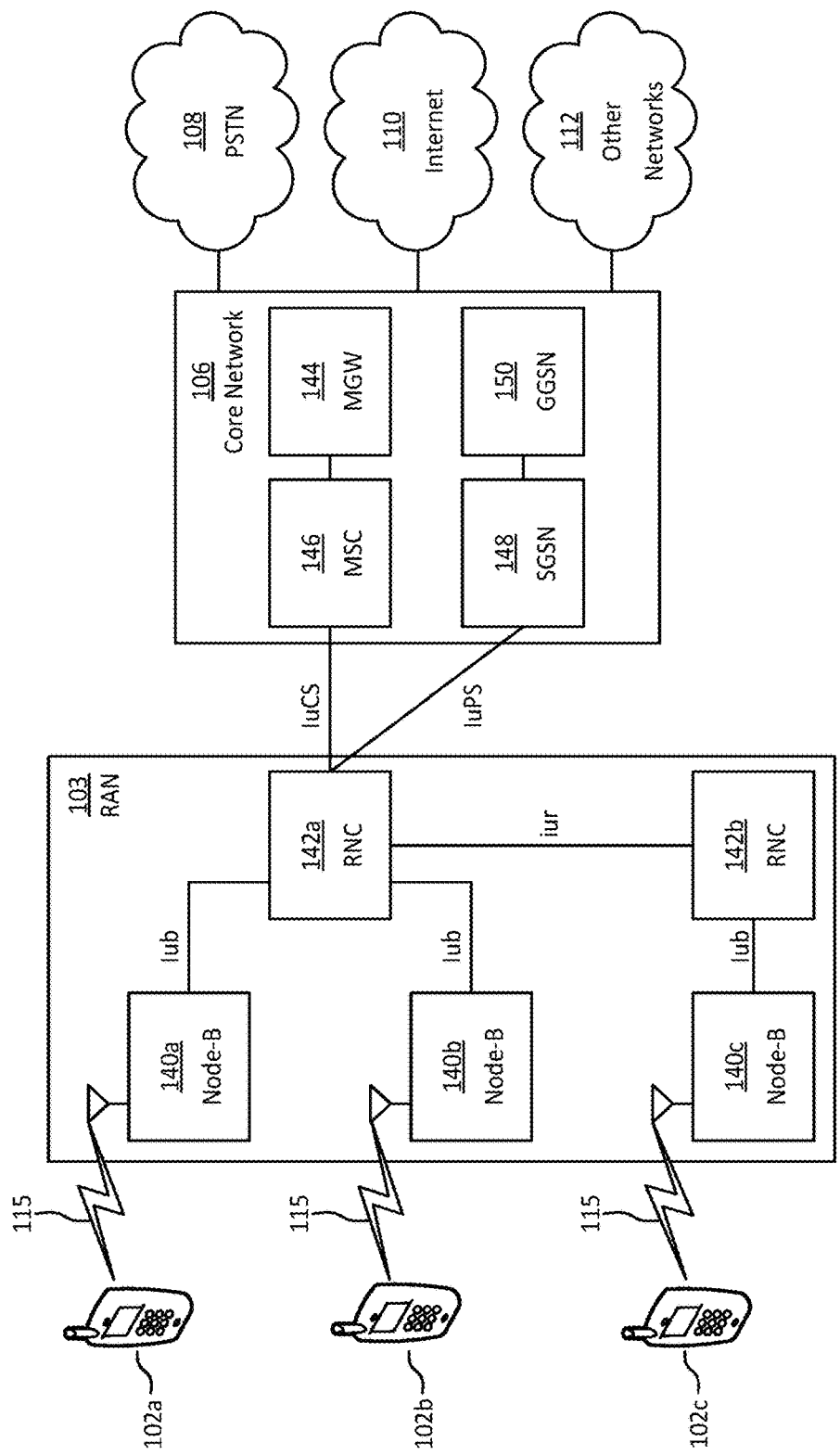
FIG. 1C is a system diagram of a RAN and a core network according to an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
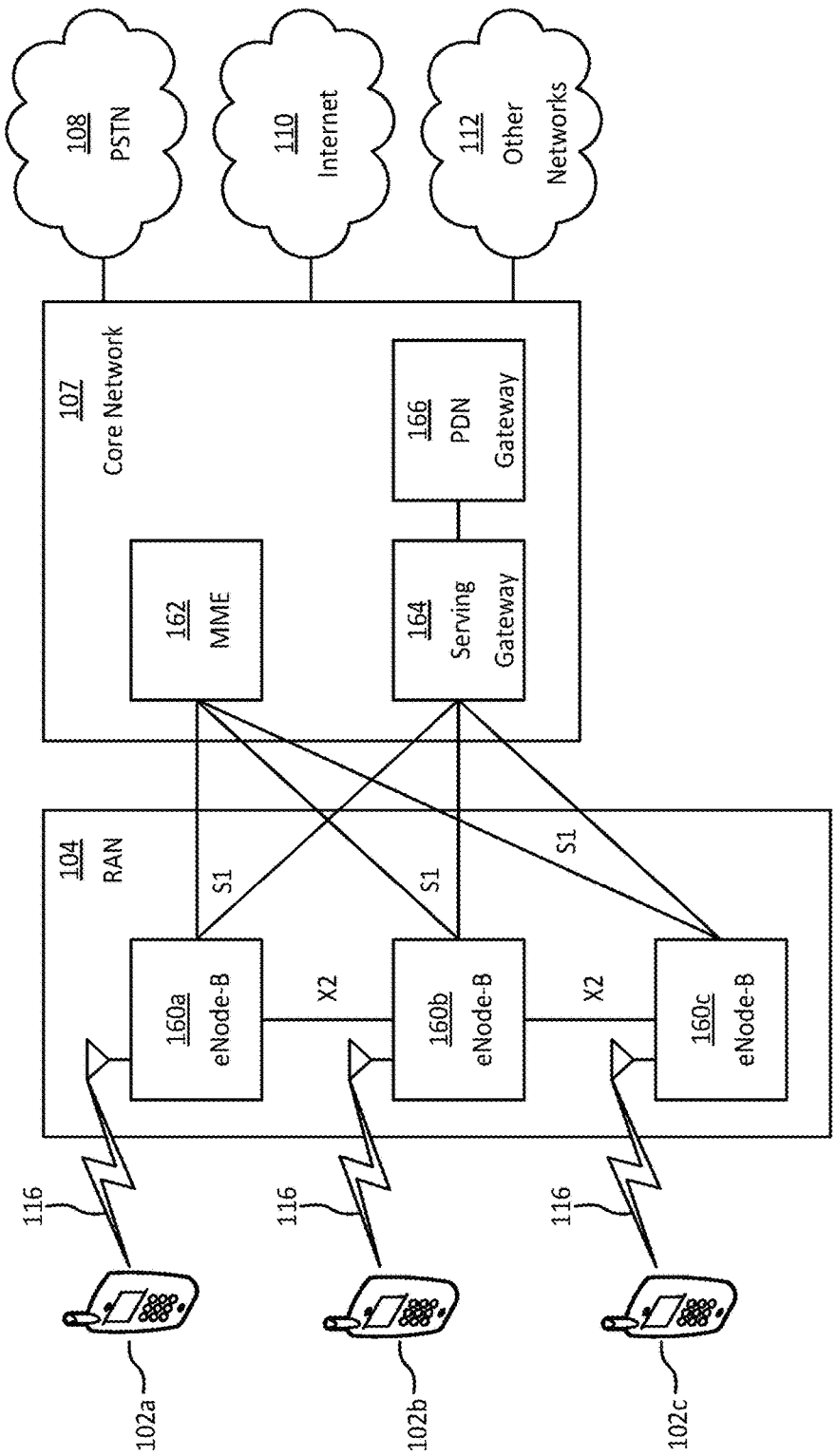
FIG. 1D is a system diagram of a RAN and a core network according to an embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
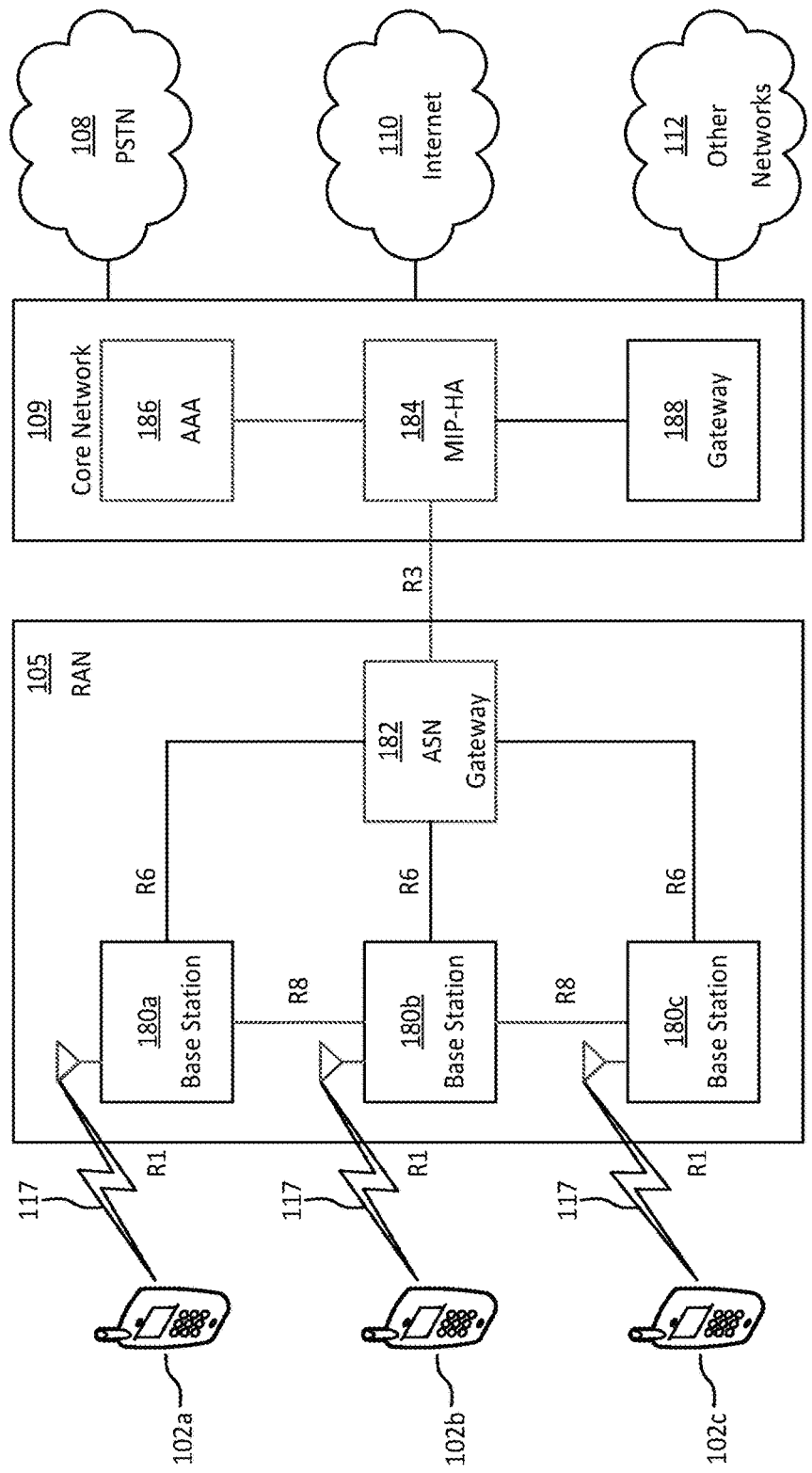
FIG. 1E is a system diagram of a RAN and the core network according to an embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
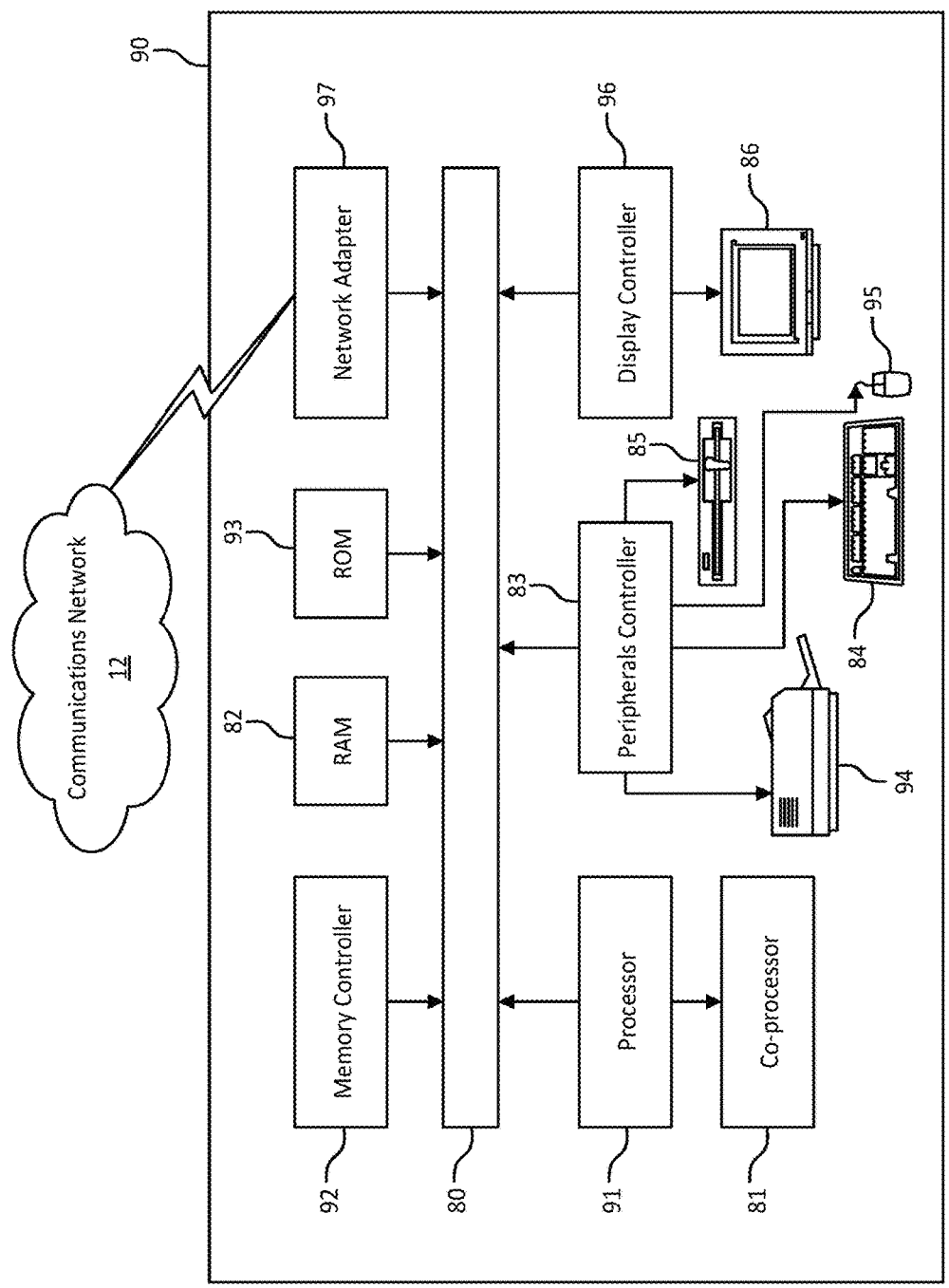
FIG. 1F is a block diagram of an exemplary computing system in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
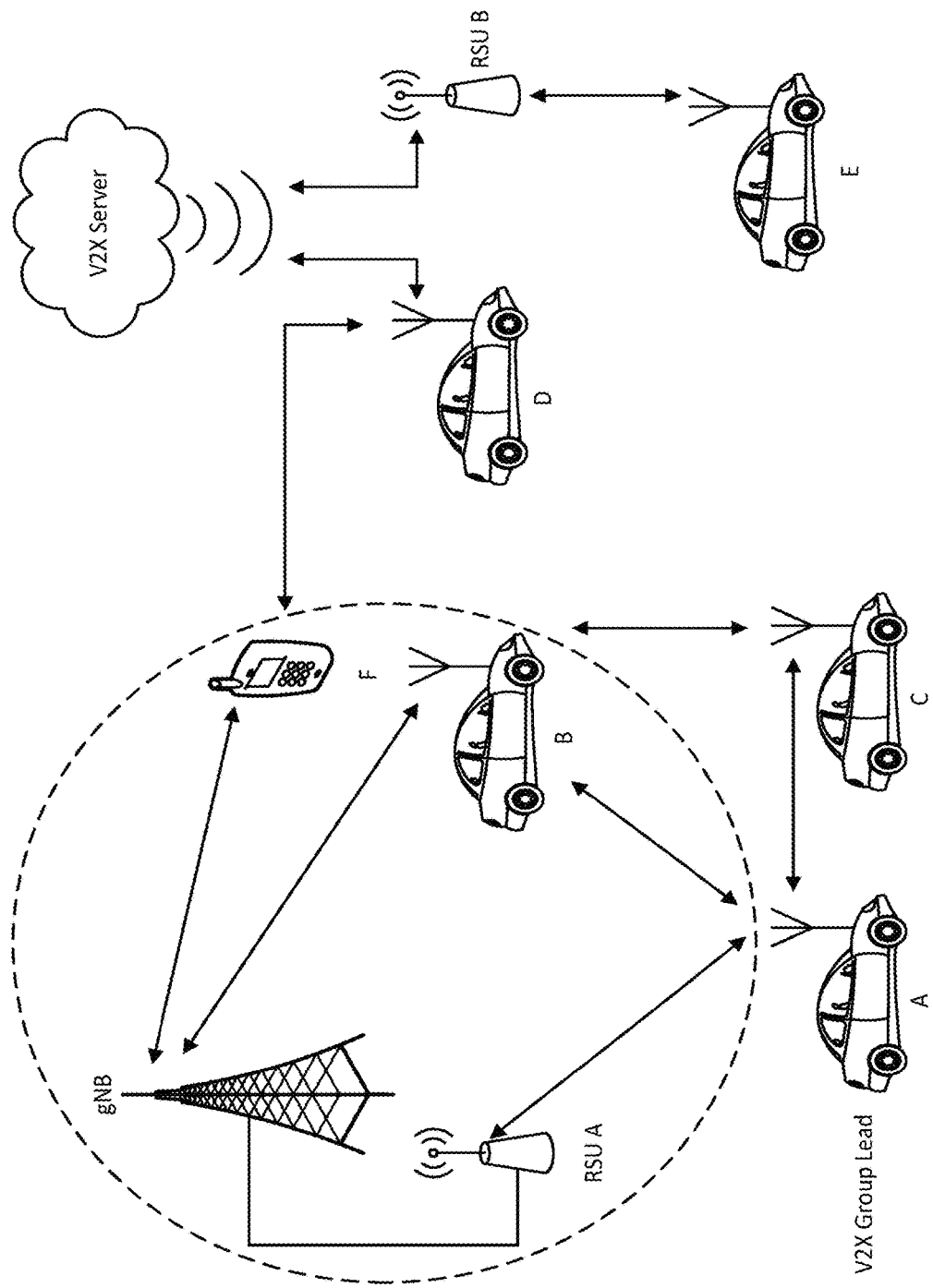
FIG. 1G illustrates one embodiment of an example communications system in which the methods and apparatuses described and claimed herein may be embodied.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The support of MBMS over LTE networks has evolved considerably over the various releases of LTE. Table 1 shows a summary of the major changes/enhancements by release. Additional details are provided below.

TABLE 1

Evolution of MBMS in LTE

| Release 8 | Release 9 | Release 10-12 | Release 13 | Release 14 | Release 16 |
|---|---|---|---|---|---|
| Initial Release of LTE. No MBS support | Main use case was video broadcast Introduced changes to RAN and system architecture MBSFN included from the start, but on a shared carrier | Added counting, service continuity, MBMS operation on Demand (MooD) | Added SC-PTM Mostly for public safety use cases | Added SC-PTM for V2X use cases to address latency considerations and IoT use cases to address reaching a large number of constrained UEs-possibly in power savings mode FeMBMS (EN-TV) MBMS dedicated carrier, new frame structure, receive only mode (i.e. no SIM card)) | Enhancements to terrestrial broadcast (new frame structures, new cyclic prefixes) to find solutions to allow EN-TV to meet 5G broadcast requirements for "terrestrial broadcast" |

LTE networks have supported MBMS since Release 9, through a mechanism referred to as MBSFN (Multicast Broadcast Single Frequency Network). MBMS was provided on carriers that were shared with unicast services. MBSFN required new logical entities in the core network and relied on simultaneous transmission of the same MBMS traffic from one or more eNBs.

Figure 2:
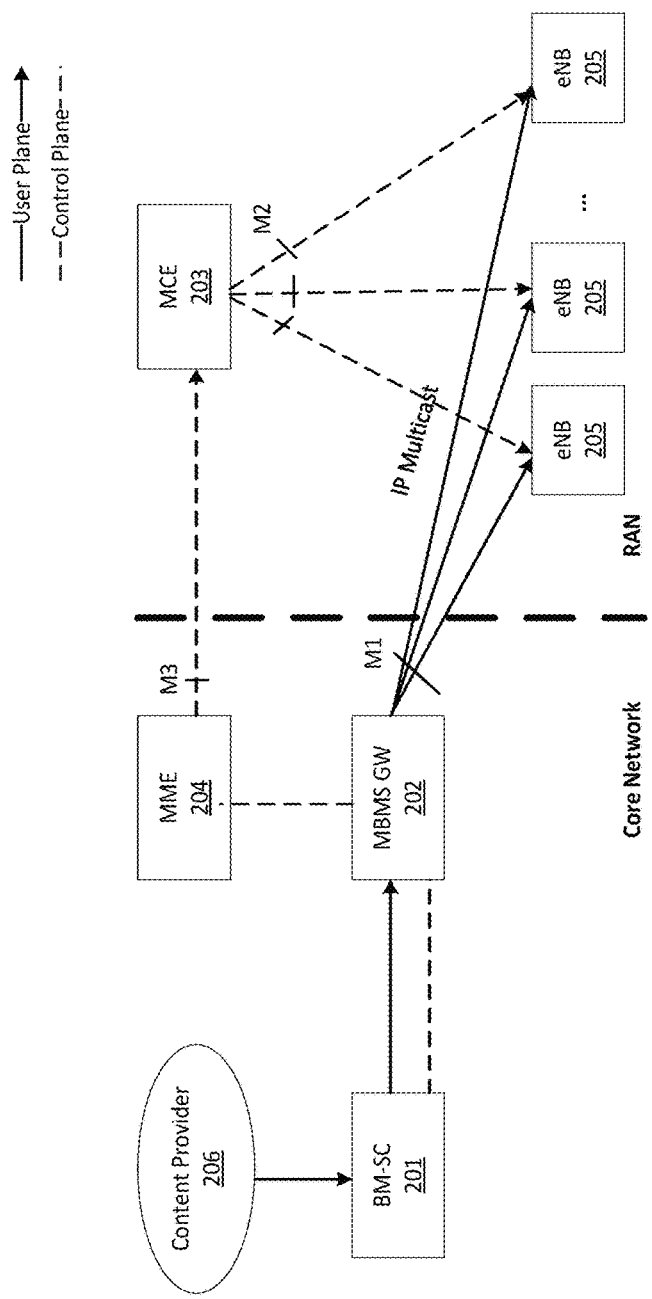
FIG. 2 shows an example of MBSFN Transmission.

FIG. 2 shows an example LTE architecture 200 for MBSFN transmission. The logical entities may include the BM-SC 201, the MBMS GW 202, the MCE 203, and the MME 204. In addition, each of the eNBs 205 shown in the figure is involved in the MBSFN transmission. The transmission may originate from, for example, a content provider 206. The transmissions from these eNBs 205 define an MBSFN Area, which comprises an area where a UE may receive MBSFN transmissions from multiple eNBs 205. The transmissions are via a Multicast transport channel (MCH) that may be mapped to a physical channel (e.g., a Physical Multicast Channel (PMCH)). The PMCH may be allowed to be transmitted in reserved subframes. For example, the reserved subframes may have been set aside by an eNB for the purpose of MBSFN transmission. These subframes may be used to carry MBMS control plane information (e.g., a Multicast Control Channel (MCCH)) and the MBS user plane traffic (e.g., a Multicast Traffic Channel (MTCH)). UEs may determine, from system information, the subframes set aside for MBS and which of these subframes carry a MCCH, as well as the configuration used for the PMCH. The latter may allow the UE to decode the traffic received on the PMCH in the reserved subframes. The UE may read the MCCH to obtain scheduling information for the MBMS user plane traffic. For example, the UE may determine which of the reserved subframes contain a flow from a particular multicast/broadcast flow. UEs may use this scheduling information to determine the multicast/broadcast flows that they are interested in and receive/decode the MBMS traffic. The UEs may monitor the MCCH to determine if there is any change in the MBMS service offering.

MBSFN operation may be used for RRC_CONNECTED and RRC_IDLE UEs. During MBSFN operation, a single transport block may be transmitted in each reserved subframe, and a single transmission may be used for MCH (neither blind HARQ repetitions nor RLC quick repeat). Further, during MBSFN operation, the MTCH and the MCCH may use the RLC-UM mode (whose configuration is fixed and known by the UEs).

Release 10 introduced RAN-based counting of UEs in connected mode interested in an MBMS service. This release also allowed the RAN to use any unused MBSFN subframes for unicast transmission. Lastly, this release enhanced the admission control for MBMS sessions by the introduction of the allocation and retention priority session parameters.

Release 11 introduced service acquisition and service continuity in multi-frequency deployments where the MBMS service is provided via more than one frequency. Initial releases of eMBMS assumed that MBMS features did not affect mobility procedures in E-UTRA. Thus, some UEs that were receiving or interested in MBMS services were unable to receive MBMS services due to cell reselection in RRC_IDLE or handover in RRC_CONNECTED. To address this issue, the network could provide assistance information to inform UEs about mapping information between carrier frequencies and MBMS services, and transmission timing of MBMS services. By using the assistance information, when the UE was interested in a particular MBMS service, the UE in RRC_IDLE could autonomously set the carrier frequency carrying the MBMS service to the highest cell reselection priority for the scheduled time. As a result, it was likely that the UE would reselect to a cell on the carrier frequency carrying the MBMS service. Also in Release 11, for a UE in RRC_CONNECTED, the UE could inform the serving cell about carrier frequencies where MBMS services of interest were scheduled to be transmitted. For this purpose, the RRC layer introduced a new uplink message called the MBMSInterestIndication message. The intention was that the CNB would use this information to select a target cell for handover.

Release 12 introduced as one of the main enhancements, MooD (MBMS operation on Demand), which enables automatic and seamless MBMS service activation and deactivation based on the UEs' service consumption reporting.

A major enhancement was the introduction of Single-Cell Point-to-Multipoint in Release 13. SC-PTM uses the same new logical entities in the core network (BM-SC, MBMS-GW) but does not rely on simultaneous transmission from multiple eNBs (as in the MBSFN case). Rather each eNB individually schedules its own MBMS transmissions. These transmissions are transported over the Downlink Shared Channel (DL-SCH) and carried on the Physical Downlink Shared Channel (PDSCH). As a result, unicast traffic and MBMS traffic are multiplexed over the DL-SCH, resulting in more flexible and dynamic radio resource allocation for MBMS transmissions. Also, since the scheduling is not left to the MCE to be synchronized across eNBs, the end-to-end latency is expected to be reduced. For SC-PTM, MBMS is transmitted in the coverage of a single cell. The SC-PTM transmission carries both a control channel (SC-MCCH) and traffic channel (SC-MTCH). SC-MCCH and SC-MTCH transmissions are each indicated by a logical channel specific RNTI on the Physical Downlink Control Channel (PDCCH). Specifically an SC-RNTI for SC-MCCH and G-RNTIs for the SC-MTCHs. Note that there is a one-to-one mapping between each MBMS session supported in a cell, and G-RNTI used for the reception of the DL-SCH to which a SC-MTCH is mapped. Even though SC-PTM is scheduled like the unicast traffic, it does not rely on any UL feedback, and as a result SC-PTM does not support link adaptation or HARQ operation. During the 3GPP work item phase there was some discussion to exploit unicast UL feedback in order to allow advanced link adaptation schemes such as adaptive modulation and coding for groups with a small number of UEs. However, this feature was finally not standardized in Rel'13. In addition, MBMS transmissions can be configured with a MBMS specific DRX pattern, so that the UE need not continuously monitor for the SC-PTM RNTIs. This pattern follows a simple ON and OFF period, with the DRX Active time being extended when the UE receives SC-PTM traffic. This MBMS specific DRX pattern is independent of the UE specific DRX pattern.

SC-PTM traffic may be received by both RRC_CONNECTED UEs and RRC_IDLE UEs. During SC-PTM operation, a single transmission may be used for DL-SCH (neither blind HARQ repetitions nor RLC quick repeat). The SC-MTCH and the SC-MCCH may use the RLC-UM mode (whose configuration is fixed and known by the UEs).

Release 14 introduced MBSFN and SC-PTM for V2X (vehicular to everything) communications, SC-PTM for Internet of Things (IoT), eMTC (enhanced Machine-Type Communication), and NB-IoT (NarrowBand-IoT). Release 14 also introduced many features to enhance the delivery of TV services with eMBMS, to expand the reach of MBMS into traditional TV receivers and to enable the deployment of dedicated broadcast eMBMS networks supporting public broadcasting requirements. Services provided may be distributed in such a way that they can be received by all, including those who are not mobile subscribers. This is also referred to as Receive-only-Mode (ROM) or Free-to-Air.

Release 16 focused on enhancements to terrestrial broadcast (specifically new frame structures, new cyclic prefixes) to find solutions to allow EN-TV to meet 5G broadcast requirements for "terrestrial broadcast"

NR MBS Requirements, Use Cases and Work Item Objectives are described herein. 3GPP RAN has considered a number of use cases which would benefit from 5G MBS support. The use cases may be classified into four main categories:

Media & Entertainment: for example, a number of users may be interested in receiving shared Virtual Reality or Augmented Reality content.

Public Warning: Users may be notified with alerts carrying multimedia messages including the description of the type of alert and multimedia data giving instructions, advice, and additional information to users (e.g., picture of a missing child, map of last known location, instructions on what to do, etc.). This traffic is "ad-hoc" in nature as the user has not necessarily subscribed to this service.

Automotive: Various V2X applications require information delivered from the Intelligent Transport System (ITS) infrastructure (such as ITS roadside units and sensors) to the vehicle. For example: road safety, signage, mapping, autonomous driving, etc.

IoT: In many situations a firmware update may be sent to a large number of devices, or a new configuration to a large number of devices. The devices themselves may have reduced capability.

The requirements for these use cases in terms of bit rate, latency, user density, and reliability are rather varied, but each would benefit from a form of PTM transmission in the RAN. Based on these use cases, 3GPP has determined a number of requirements related to 5G MBS. During the scoping for Release 17, 3GPP RAN converged on a series of high level requirements that are expected from 5G MBS. This may include:

Bit rate: can be very high;
Latency: can be very low;
Reliability: must support use cases with extremely high reliability;
Density: should be able to deal with extremely dense deployments;
Mobility: should be able to handle high mobility UEs;
Flexibility: Operator should be able to dynamically change the capacity reserved for MBS and the size of service area;
Efficiency: The operator should be able to dynamically change how the service is provided to the UE (multicast, broadcast, unicast, PTP, PTM) as well as to allow UE to be able to receive multiple parallel services (one or more unicast services plus one or more MBS services).

As a result, a 3GPP RAN group has started a new work item [3] that addresses some of the limitations of the MBMS operation over LTE and tries to meet the requirements listed above.

The work item has two main objectives:

Specify RAN basic functions for broadcast/multicast for UEs in RRC_CONNECTED state, including:
Specifying a group scheduling mechanism to allow UEs to receive Broadcast/Multicast service (also including specifying the necessary enhancements that are required to enable simultaneous operation with unicast reception;
Specifying support for dynamic change of Broadcast/Multicast service delivery between multicast (PTM) and unicast (PTP) with service continuity for a given UE;
Specifying support for basic mobility with service continuity;
Specifying required changes to improve reliability of Broadcast/Multicast service, e.g., by UL feedback. The level of reliability should be based on the requirements of the application/service provided;
Study the support for dynamic control of the Broadcast/Multicast transmission area within one gNB-DU and specify what is needed to enable it, if anything.

Specify RAN basic functions for broadcast/multicast for UEs in RRC_IDLE/RRC_INACTIVE states [RAN2, RAN1]:
Specifying required changes to enable the reception of Point to Multipoint transmissions by UEs in RRC_IDLE/RRC_INACTIVE states, with the aim of keeping maximum commonality between RRC_CONNECTED state and RRC_IDLE/RRC_INACTIVE state for the configuration of PTM reception.

Note that the work item does not include any objectives related to FR2 operation, SFN operation, dynamic resource allocation of up to 100% to MBS, and Receive only-mode operation. Despite this, there is a general requirement that any design decisions taken should not prevent introducing such features or operations in future releases.

NR MBS Operation is described herein. As part of the development for NR MBS, the 3GPP working groups have made a number of agreements regarding the operation. A few of these are listed below:

Initial RAN focus may be on NR Standalone deployments;
For multicast services, network supports PTP and PTM transmission of shared traffic delivered by 5GC, at least for connected mode (this is not intended to exclude other cases);
For a UE, gNB dynamically decides whether to deliver multicast data by PTM or PTP;
The RAN may support 2 delivery modes:
Delivery mode 1 for high QoS (reliability, latency) requirement, to be available in RRC_CONNECTED (possibly the UE can switch to other states when there is no data reception TBD). Mostly for multicast session;
Delivery mode 2 for "low" QoS requirement, where the UE can also receive data in RRC_CONNECTED, RRC_IDLE, and RRC_INACTIVE. Mostly for broadcast sessions, but potentially also for multicast sessions.

Information of MBS services/groups subscribed by the UE (e.g., TMGI) and QOS requirements of an MBS service should be provided to RAN;
SDAP functionality supported: mapping from QoS flows to MBS RBs;
PDCP functionality supported: RoHC (at least U-mode); reordering and in-order delivery function in PDCP; transfer of data; maintenance of PDCP SNs; duplicate discarding; status reporting may be supported (for lossless handover).
RLC functionality supported: RLC-AM for PTP transmission; RLC UM for PTP transmission; RLC UM for PTM transmission of NR MBS.

Lossless handover is supported for cases where the source cell and target cell both support MBS;

In order to support the lossless handover for 5G MBS services, at least DL PDCP SN synchronization and continuity between the source cell and the target cell should be guaranteed by the network side.

From network side, the source gNB may forward the data to the target gNB and the target gNB may deliver the forwarding data.

An MRB may include both PTP leg and PTM leg;

For the case of a split bearer, both PTP leg and PTM leg are RLC-UM, configuration with No L2 ARQ and with PDCP anchored PTM-PTP switching is supported (e.g., for services that would typically be configured with RLC UM for unicast).

For RRC_IDLE/RRC_INACTIVE UEs for NR MBS delivery mode 2 the MBS configuration (for broadcast/delivery mode 2) is provided by a two-step based approach (i.e. BCCH and MCCH) as adopted by LTE SC-PTM. Assumption is that this may also be used for RRC_CONNECTED UEs;

Assumption that MCCH change notification mechanism is used to notify the changes of MCCH configuration due to session start for delivery mode 2 of NR MBS (other cases are FFS).

Assumption that MBS Interest Indication is supported for UEs in connected mode for Broadcast service.

RAN defined three transmission schemes:

PTP transmission: For RRC_CONNECTED UEs, use UE-specific PDCCH with CRC scrambled by UE-specific RNTI (e.g., C-RNTI) to schedule UE-specific PDSCH which is scrambled with the same UE-specific RNTI.

PTM transmission scheme 1: For RRC_CONNECTED UEs in the same MBS group, use group-common PDCCH with CRC scrambled by group-common RNTI to schedule group-common PDSCH which is scrambled with the same group-common RNTI. This scheme can also be called group-common PDCCH based group scheduling scheme.

PTM transmission scheme 2: For RRC_CONNECTED UEs in the same MBS group, use UE-specific PDCCH with CRC scrambled by UE-specific RNTI (e.g., C-RNTI) to schedule group-common PDSCH which is scrambled with group-common RNTI. This scheme can also be called UE-specific PDCCH based group scheduling scheme.

To deliver an MBS TB, for initial transmission, PTM transmission scheme 1 is supported; other schemes are still under discussion.

For retransmission, when PTM transmission scheme 1 is used in initial transmission, PTM transmission scheme 1 and PTP transmission (when ACK/NACK based HARQ is supported) are supported; PTM transmission scheme 2 is still under discussion.

For RRC_CONNECTED UEs, HARQ-ACK feedback is supported for multicast.

For RRC_CONNECTED UEs receiving multicast, the following is supported:

ACK/NACK based HARQ-ACK feedback for multicast:

It is up to network to configure orthogonal PUCCH resources among UEs within the same group.

If initial transmission for multicast is based on PTM transmission scheme 1, support retransmission(s) using PTP transmission. The HARQ process ID and NDI indicated in DCI is used to associate the PTM scheme 1 and PTP transmitting the same TB.

FFS: NACK-only based HARQ-ACK feedback for multicast:

It is up to network to configure the PUCCH resources and the PUCCH resources can be shared among UEs within the same group.

Enabling/disabling HARQ-ACK feedback for MBS is supported.

The priority for HARQ-ACK feedback for RRC_CONNECTED UE receiving multicast can be lower, higher than or equal to the HARQ-ACK feedback for unicast.

Based on the progress in the NR MBS development, a number of open issues have been identified. The first open issue deals with the mapping of UEs to the G-RNTI. The G-RNTI denotes the RNTI for a group of UEs. A MBS transport block is sent using the G-RNTI. However, it is still unclear which UEs are in this group. Various options have been discussed including:

1:1 mapping between MBS service and G-RNTI. All UEs interested in the service listen to G-RNTI;

N:1 mapping between MBS service and G-RNTI. A set of N services are multiplexed on one transport block transmitted over a single G-RNTI;

G-RNTI is for a geographic area. All services that are offered in geographic area are multiplexed over a single G-RNTI.

A second open issue deals with how to achieve reliability. Some MBS services require high reliability, but how to achieve this reliability is still open. Various options have been discussed: keeping all services requiring high reliability over PTP legs or unicast DRBs, Layer 2 retransmission at PDCP layer, Layer 2 retransmission at RLC layer, Layer 1 HARQ retransmission with ACK/NACK feedback.

A third open issue deals with the multiple ways the network may provide the same multicast service. Multicast services may be provided over DRB or MRB, the MRB may be split bearer or non-split bearer and the service may be duplicated over more than one MRB.

Depending on the decisions made for these open issues, a number of resulting problems need to be addressed. The list of problems is divided into two broad areas: Multiplexing Problem(s) and Reliability Problem(s).

Multiplexing Problems are described herein.

Problem 1: Procedure for Multiplexed MBS Traffic:

The gNB may be permitted to multiplex MBS traffic from multiple MBS services over a single transport block. As a result, a UE may receive a transport block that has MBS traffic from a logical channel that is not of interest to the UE. Procedures need to be defined to allow the UE to deal with receiving a multiplexed transport block. This needs to consider multiplexing at both the SDAP and MAC layer, as well as optimizations to HARQ feedback signaling.

In addition, the gNB may be permitted to multiplex unicast traffic with the multicast traffic over a single transport block. The unicast traffic may be destined to one of the UEs receiving the transport block transmitted over the G-RNTI. Procedures are defined herein to allow the UE to deal with receiving this multiplexed transport block.

Problem 2: Procedure for Logical Channel Prioritization at UE:

A UE receiving MBS traffic may be required to send MBS related uplink transmissions (e.g., status reports, HARQ feedback, measurements) in support of the MBS traffic. In addition, this UE may also be simultaneously communicating over the Uu interface and over the SL interface. The actions of the UE when the MBS related uplink transmissions overlap with the Uu or SL transmissions are not defined. When a UE is not able to send these transmission simultaneously, the UE needs prioritization rules to select one transmission over another.

Reliability Problems are described herein.

Problem 3: Procedure for HARQ Retransmission Over C-RNTI:

A UE may receive an initial transmission of a transport block over a G-RNTI and a retransmission over the C-RNTI. In such cases, the UE needs a mechanism to associate the received transport block over C-RNTI to the same HARQ process that handled the reception on the G-RNTI (this is to allow the UE to perform soft combining). Secondly, the UE needs rules to determine when to monitor the C-RNTI for the HARQ retransmissions. Lastly, procedures need to be defined to address potential HARQ process collisions. These collisions occur when a UE is receiving a retransmitted transport block over a C-RNTI, but the network starts transmitting a new transport block over G-RNTI using the same HARQ process. Consider the case that the gNB decides to send retransmissions of some MBS traffic over a C-RNTI. The assumption is that the gNB would use the same HARQ process ID for the C-RNTI transmissions as the one used for the initial G-RNTI transmission (so that the UE could soft combine the two transmissions). But the gNB continues to process MBS data, and eventually may transmit a new TB on the original HARQ process over the G-RNTI. In this case, the UE could receive a retransmission of TB1 on C-RNTI for HARQ process K, and a new transmission of TB2 on G-RNTI for HARQ process K.

Problem 4: Procedure for Sending PDCP Status Report:

PDCP Status Reports are used to guarantee lossless handover for services that have high reliability requirements. The same mechanism can also be used for MBS services requiring high reliability, in order to guarantee lossless PTM-PTP switching as well as lossless MRB reconfiguration. However, new triggers for sending the PDCP status report need to be defined to enable the lossless PTM-PTP switching and lossless MRB reconfiguration. Secondly, the transmission of the PDCP status report requires an uplink path from the UE to the gNB. Such an uplink path is not always available for MBS services. Solutions are needed to enable the transmission of PDCP status reports in such cases.

Problem 5: Procedure for UE Joining an Already Started/Activated Multicast Session:

When a UE starts receiving traffic for an MBS service, that service may already be active, and sending MBS traffic to other UEs. The active service is made up of one or more MRBs and these MRBs each have a PDCP, RLC, and HARQ state and context. The UE is not aware of this context and this leads to certain synchronization issues. For example, the RLC UM reassembly window of the UE MRB may not be synchronized to the RLC UM transmissions for this MRB. This may result in the UE discarding certain MBS traffic. UE procedures to deal with a UE joining an already active MBS session need to be defined.

Problem 6: Procedure for UE During Transition from Multicast ACTIVE to Multicast INACTIVE:

A multicast session may be in an ACTIVE or INACTIVE state. In the INACTIVE state, no MBS data traffic is sent to the UE, and the UE may transition to RRC IDLE or RRC INACTIVE modes. The UE actions upon the transitioning of a multicast service to INACTIVE is defined herein for the case that multiple MBS services are multiplexed over a single G-RNTI.

Problem 7: Procedure for Reliable Transmission when MBS is Pre-Empted:

In order to support URLLC, a gNB may preempt eMBB transmissions as well as MBS transmissions. When this pre-emption occurs, a portion of the received transport block may be corrupted. If this pre-emption occurs for a multicast transport block that requires HARQ feedback, many multicast UEs may send a NACK to the gNB. This is inefficient for the uplink.

Power Savings problems are described herein.

Problem 8: DRX Granularity for NR MBS:

In LTE, in order to save power, a UE may be configured with DRX for reception of SC-PTM. The UE monitors the G-RNTI and SC-RNTI for the SC-PTM only during the active times of the configured DRX. The DRX is configured per SC-MTCH. Since LTE SC-PTM does not support multiplexing of MBMS services over a G-RNTI, effectively, the DRX configuration is per G-RNTI. For NR MBS, it is likely that multiple MBS services will be multiplexed over a single G-RNTI, and as a result, the granularity of the DRX for NR MBS needs to be defined.

Problem 9: DRX Configuration for NR MBS

Since LTE SC-PTM did not support HARQ feedback for MBMS, the DRX configuration was based on: DRX cycle, DRX start offset, ON duration timer, and inactivity timer. However, as HARQ feedback and HARQ retransmissions are allowed for NR MBS, the DRX configuration will need to take these retransmissions into account.

Problem 10: UE DRX Procedure

UE DRX procedures for the Uu link for NR unicast transmissions assume that: 1) HARQ feedback is sent from the UE to the gNB; 2) a transport block includes only logical channels configured for the receiving UE. In NR MBS, these two assumptions do not hold. First, HARQ feedback may be enabled/disabled and furthermore the mode of the HARQ retransmissions may vary. RAN1 has defined three modes: PTM scheme 1, PTM scheme 2, and PTP scheme. Second, a transport block received by a UE may contain logical channels which are not of interest to a UE. These factors need to be taken into account in the MBS DRX procedure.

MBS services offered over NR are intended to have various QoS requirements. How this traffic is delivered to the interested UEs is intended to be very flexible and to also be adaptable. The network capable of dynamically changing how the traffic is delivered to a UE.

However, this flexibility and the varied QoS requirements that are expected to be supported, leads to a number of problems with efficiently transmitting this MBS traffic. Problems dealing with how to configure the MBS radio bearers for the service, how to efficiently multiplex MBS services, how to improve the reliability of MBS transmissions, and how to deal with starting reception of an MBS service that is already being received by other UEs.

This disclosure attempts to address these problems by proposing:

Procedures for managing multiplexed MBS traffic;

Procedures for prioritization between MBS related UL traffic, unicast UL traffic, and SL traffic;

Procedures for handling HARQ retransmissions over C-RNTI;

Procedures to support PDCP Status Reporting for MBS services;

Procedures for UE joining already started/activated Multicast Sessions;

Procedures for dealing with multicast transition from active to inactive;

Procedure for dealing with MBS traffic pre-emption;

Procedures for DRX operation for UEs receiving MBS traffic.

Procedures for Multiplexed MBS traffic are described herein.

The following embodiments are described herein:

Embodiment 1: A first device configured to receive multiplexed MBS services via one or more MBS radio bearers (MRB) and/or one or more unicast data radio bearers (DRBs).

Embodiment 2: The first device of embodiment 1, where the UE is configured with a single SDAP entity for the MBS services, and multiplexing of traffic is at the SDAP layer. Multiplexing multiple MBS QoS flows across different MBS services, over the same MRB.

Embodiment 3: The first device of embodiment 1, where the multiplexing of traffic is at the MAC layer. Multiplexing multiple logical channels across different MBS services, over the same transport block.

Embodiment 4: The first device of embodiment 3, where the logical channel IDs (LCIDs) of all multiplexed logical channels are unique, and the UE is configured with a list of LCIDs related to the MBS services of interest. Upon disassembling the transport block, logical channels that are not on this list are discarded by the disassembly and demultiplexing entity.

Embodiment 5: The first device of embodiment 3, where the logical channel IDs (LCIDs) of all multiplexed logical channels are not guaranteed to be unique, and where the MAC PDU includes an identifier for each multiplexed MAC SDU to allow the UE to determine if the SDU is for a logical channel corresponding to an MBS service of interest. Upon disassembling the transport block, the disassembly and demultiplexing entity uses this header to determine if the MAC SDU is for an MBS service of interest. MAC SDU not corresponding to an MBS service of interest are discarded.

Embodiment 6: The first device of embodiment 5, where the identifier is a MBS service ID (such as the TMGI or session ID or some alternative ID that identifies the MBS service), and where the UE is provided the list of MBS service IDs for its MBS services of interest.

Embodiment 7: The first device of embodiment 3, where the logical channel IDs (LCIDs) of all multiplexed logical channels are not guaranteed to be unique, and where the DCI scheduling the transport block contains a bit field to denote which MBS services are multiplexed in the transport block.

Embodiment 8: The first device of embodiment 7, where the PHY layer is provided with MBS services of interest. If the DCI indicates that the transport block does not contain any MBS services of interest, the UE does not decode the transport block.

Embodiment 9: The first device of embodiment 7, where the PHY layer provides the transport block and bit field to the HARQ entity. If the bit field indicates that the transport block does not contain any MBS services of interest, the HARQ entity decides to discard the transport block.

Embodiment 10: The first device of embodiment 9, where if the UE discards the transport block, it may send as HARQ feedback: an ACK, DTX, or a Don't Care.

Procedure for Logical Channel Prioritization at UE are described herein.

Embodiment 11: The first device of embodiment 1, where the device determines which traffic to prioritize, when MBS related UL transmissions overlap with unicast UL transmissions or sidelink transmissions, and the UE is not capable of simultaneous transmission.

Embodiment 12: The first device of embodiment 11, where the priority of the transmissions is always fixed.

Embodiment 13: The first device of embodiment 12, where MBS related uplink transmissions is always de-prioritized with respect to the sidelink transmissions or the unicast uplink transmissions.

Embodiment 14: The first device of embodiment 12, where MBS related uplink transmissions is always be prioritized with respect to the sidelink transmissions or the unicast uplink transmissions.

Embodiment 15: The first device of embodiment 11, where the MBS related uplink traffic is assigned a certain priority value.

Embodiment 16: The first device of embodiment 15, where the priority value of the MBS related uplink traffic is equal to the priority value of the multiplexed MBS transport block.

Embodiment 17: The first device of embodiment 16, where the priority value of the multiplexed MBS transport block is set to the priority value of the highest priority logical channel that is multiplexed in the transport block.

Embodiment 18: The first device of embodiment 16, where the priority value of the multiplexed MBS transport block is set to the weighted average of the priority values of the logical channels that are multiplexed in the transport block.

Embodiment 19: The first device of embodiment 11, where the priority of the transmissions is based on the relative priority of MBS related uplink transmissions and the sidelink transmissions or the unicast uplink transmissions. UE transmits the traffic with the highest priority (for example the traffic with the lowest priority value).

Embodiment 20: The first device of embodiment 11, where the priority of the transmissions is based on the priority of MBS related uplink transmissions compared to a threshold (MBSPriorityThreshold). If the priority value of MBS related uplink transmissions is below the threshold, the MBS related uplink transmissions is prioritized. If the priority value of MBS related uplink transmissions is above the threshold, the MBS related uplink transmissions is de-prioritized.

Embodiment 21: The first device of embodiment 11, where the priority of the transmissions is based on the relative priority of the different traffic as well as thresholds associated with each traffic (MBSPriorityThreshold, ULPriorityThreshold, SLPriorityThreshold). If the priority value of uplink transmissions is below the ULPriorityThreshold, the uplink transmissions is prioritized. If the priority value of uplink transmissions is above the ULPriorityThreshold, the UE prioritizes the traffic with the lower priority value.

Embodiment 22: The first device of embodiment 11, where the MBS related uplink transmissions include: RRC messages, MAC CEs, PDCP status reports, PDCP control PDUs, RLC status reports, RLC control PDUs, HARQ feedback.

Embodiment 23: The first device of embodiment 18, where the UE has a fixed priority between the different MBS related uplink transmissions.

Procedures for HARQ Retransmission over C-RNTI are described herein.

Embodiment 24: A first device, that:
  Receives configuration for one or multiple sets of HARQ processes: One set of DL HARQ processes for the unicast transmissions, one set of MBS HARQ processes for the MBS transmissions, a broadcast HARQ process for the BCCH transmissions, one set of SL HARQ processes for the SL transmissions;
  Receives a DCI scheduling the PDSCH for MBS transmissions;
  Monitors C-RNTI for the MBS retransmissions; Decodes a transport block, determines the HARQ process to handle the transport block, and forwards the transport block to the determined HARQ process.

Embodiment 25: The first device of embodiment 24, where the UE is configured to receive MBS initial transmissions over G-RNTI and MBS retransmissions over C-RNTI, and where both the initial transmission and the retransmission are for the same MBS HARQ process.

Embodiment 26: The first device of embodiment 24, where the DCI includes one or more of the following: HARQ Process ID, G-RNTI/C-RNTI indication, NDI, MBS HARQ process indicator, MBS indicator.

Embodiment 27: The first device of embodiment 24, where the first device only monitors the C-RNTI for the MBS retransmissions during periods when MBS activity is expected.

Embodiment 28: The first device of embodiment 24, where the first device only monitors the C-RNTI for the MBS retransmissions if the first device has sent a NACK for a transport block.

Embodiment 29: The first device of embodiment 24, where the first device only monitors the C-RNTI for the MBS retransmissions during periods when MBS activity is expected and the first device has sent a NACK for a transport block.

Embodiment 30: The first device of embodiment 24, where if the first device is in RRC_Idle or RRC_Inactive, the UE monitors the C-RNTI for the MBS retransmissions during periods when MBS activity is expected and the first device has sent a NACK for a transport block.

Embodiment 31: The first device of embodiments 27, 28, 29, and 30, where MBS activity is expected during the DRX active times of the MBS service.

Embodiment 32: The first device of embodiment 24, where the determining the HARQ process to handle the transport block is based on one of the following: MBS HARQ process indicator, MBS indicator, presence or absence of G-RNTI/C-RNTI indication.

Embodiment 33: The first device of embodiment 24 that detects a HARQ process collision-UE may receive transport block A over C-RNTI (a retransmission) and transport block B over G-RNTI (a new transmission). Both these transport blocks are destined to be handled by the same MBS HARQ process.

Embodiment 34: The first device of embodiment 33, that considers only the transport block received over the C-RNTI and discards the transport block received over the G-RNTI.

Embodiment 35: The first device of embodiment 33, that considers only the transport block received over the G-RNTI, flushes the HARQ process and considers the G-RNTI as a new transmission.

Procedures for UE joining an already started/activated Multicast Session are described herein.

Embodiment 36: A first device, that joins an already active multicast session, and that:
Receives a configuration with a MRB having a PTM leg with RLC-UM;
Determines the initial value of RX_Next_Reassembly and RX_Next_Highest;
Receives a UMD PDU.

Embodiment 37: The first device of embodiment 36, where the determination of RX_Next_Reassembly and RX_Next_Highest is based on information included in the received configuration.

Embodiment 38: The first device of embodiment 36, where the determination of RX_Next_Reassembly and RX_Next_Highest is based on the value of the SN of the first received UMD PDU.

Embodiment 39: The first device of embodiment 36, where the determination of RX_Next_Reassembly and RX_Next_Highest is based on the value provided by the gNB using a control PDU.

Embodiment 40: The first device of embodiment 36, where the determination of RX_Next_Reassembly and RX_Next_Highest is based on information carried in the header of the received UMD PDU.

Embodiment 41: A first device, that joins an already active multicast session, and that:
Receives a configuration with a MRB having a PTM leg with RLC-AM;
Determines the initial value of RX_Next;
Receives a AMD PDU.

Embodiment 42: The first device of embodiment 41, where the determination of RX_Next is based on information included in the received configuration.

Embodiment 43: The first device of embodiment 41, where the determination RX_Next is based on the value of the SN of the first received AMD PDU.

Embodiment 44: The first device of embodiment 41, where the determination of RX_Next is based on the value provided by the gNB using a control PDU.

Embodiment 45: The first device of embodiment 41, where the determination of RX_Next is based on information carried in the header of the received AMD PDU.

Embodiment 46: A first device, that joins an already active multicast session, and that:
Receives a configuration with a MRB requiring in order delivery;
Determines the initial value of RX_NEXT and RX_DELIV;
Receives a PDCP PDU.

Embodiment 47: The first device of embodiment 46, where the determination of RX_NEXT and RX_DELIV is based on information included in the received configuration.

Embodiment 48: The first device of embodiment 46, where the determination RX_NEXT and RX_DELIV is based on the value of the COUNT of the first received PDCP PDU.

Embodiment 49: The first device of embodiment 46, where the determination of RX_NEXT and RX_DELIV is based on the value provided by the gNB using a control PDU.

Embodiment 50: The first device of embodiment 46 where the determination of RX_NEXT and RX_DELIV is based on information carried in the header of the received PDCP PDU.

Embodiment 51: A first device, that joins an already active multicast session, and that:
Receives a configuration with a MRB with HARQ feedback enabled;
Receives a transport block;
Determines whether to transmit HARQ feedback.

Embodiment 52: The first device of embodiment 51, where the determination is based on whether the initial transmission received for a HARQ process is a new transmission or a retransmission.

Embodiment 53: The first device of embodiment 51, where the determination is based on whether the transport block has already been ACKed, up to a maximum number of times.

Embodiment 54: The first device of embodiment 1, that is triggered to send a PDCP status report based on one or more of the following triggers: device detects missing MBS PDUs, MBS radio bearer reconfiguration, PTM-PTP switch, PTP-PTM switch.

Embodiment 55: The first device of embodiment 54, where the PDCP status report is sent by one or more of the following methods: RRC signaling, NAS signaling, RACH, over a linked radio bearer, over the PTP leg of a MRB.

Procedure for dealing with multicast transition from active/inactive to inactive/active:

Embodiment 56: A first device, that has joined a multicast session, and that:

Receives an indication that a first multicast session is transitioning from active to inactive, or vice-versa, Determines if the G-RNTI carrying the first multicast session carries a second active multicast session, and Controls the PDCP, RLC and MAC DRX behavior, based on this determination and based on the indication.

Embodiment 57: The first device of embodiment 56, wherein the indication is received in one of RRC message, MAC CE, or PHY DCI.

Embodiment 58: The first device of embodiment 57, wherein the indication in the PHY DCI is a bitmap, where a '1' in bit 'k' denotes that MBS session with index 'k' is changing from active/inactive to inactive/active.

Embodiment 59: The first device of embodiment 56, wherein if the indication indicates a multicast active to inactive transition, and the determination reveals that the UE is receiving the second active multicast session, the UE may further:

Stop DRX for the MBS session,

Perform RLC entity re-establishment for radio bearers of the inactive MBS session, and Suspend PDCP entity radio bearers of the inactive MBS session.

Embodiment 60: The first device of embodiment 56, wherein if the indication indicates a multicast active to inactive transition, and the determination reveals that the UE is not receiving the second active multicast session, the UE may further:

Stop monitoring the G-RNTI and stop processing transport blocks received on the G-RNTI, Stop DRX for the G-RNTI, Perform RLC entity re-establishment for radio bearers of the inactive MBS session, Suspend PDCP entity radio bearers of the inactive MBS session, and Clear HARQ processes associated with the G-RNTI (for example those HARQ processes that are recovering transport blocks whose destination is the G-RNTI).

Embodiment 61: The first device of embodiment 56, wherein if the indication indicates a multicast inactive to active transition, and the determination reveals that the UE is receiving the second active multicast session, the UE may further:

Start DRX for the MBS session, and

Resume PDCP entity radio bearers of the inactive MBS session.

Embodiment 62: The first device of embodiment 56, wherein if the indication indicates a multicast inactive to active transition, and the determination reveals that the UE is not receiving the second active multicast session, the UE may further:

Start monitoring the G-RNTI. Follow the DRX configuration, if configured, for this G-RNTI, and Resume PDCP entity radio bearers of the inactive MBS session.

Procedure for dealing with MBS traffic pre-emption:

Embodiment 63: A first device, that has joined a multicast session, and that:

Receives an MBS transport block,

Receives a pre-emption indication RNTI, and

Determines whether or not to send HARQ feedback for the pre-empted MBS transport block.

Embodiment 64: The first device of embodiment 63, wherein the determination is based on whether the MBS transmission is a new transmission or retransmission.

Embodiment 64a: The first device of embodiment 63, where the determination is based on an indication in the DCI scheduling the MBS transmission.

Procedures for DRX operation for UEs receiving MBS traffic:

Embodiment 65: A first device, that has joined an MBS session, and that:

Receives one or more DRX configurations for MBS transmissions, including one for each MBS group (G-RNTI), one for each MCCH (SC-RNTI), Determines the active time based on the DRX configuration, and Monitors RNTI during the active time from: G-RNTI, SC-RNTI, C-RNTI, INT-RNTI Embodiment 66: The first device of embodiment 65, wherein the DRX configuration containing one or more of the following parameters: drxMBS-onDurationTimer, drxMBS-SlotOffset, drxMBS-InactivityTimer, drxMBS-RetransmissionTimerDL, drxMBS-LongCycleStartOffset, drxMBS-ShortCycle, drxMBS-ShortCycleTimer, drxMBS-HARQ-RTT-TimerDL.

Embodiment 67: The first device of embodiment 65, wherein the DRX active time includes the time while the following timers are running: drxMBS-onDurationTimer, drxMBS-InactivityTimer, drxMBS-RetransmissionTimerDL.

Embodiment 68: The first device of embodiment 66, wherein the UE may stop the inactivity timer for PTM scheme 1 MBS transmission to the G-RNTI if the transport block does not contain any MTCH channels for MBS sessions of interest the UE.

Embodiment 69: The first device of embodiment 66, wherein the UE determines the RNTI to monitor while the retransmission timer is running.

Embodiment 70: The first device of embodiment 69, wherein the UE always monitors both C-RNTI and G-RNTI.

Embodiment 71: The first device of embodiment 69, wherein the UE determination is based on configuration from the network.

Embodiment 72: The first device of embodiment 69, wherein the UE determination is based on an indication carried in the initial transmission indicating how the gNB will send the retransmissions.

Embodiment 73: The first device of embodiment 66, wherein the UE determines whether to start the retransmission timer when it fails to decode the transport block.

Embodiment 74: The first device of embodiment 73, wherein the determination is based on an indication from the gNB that this is the last retransmission of a transport block and that the UE should not start the retransmission timer.

The terms leg and path may be used herein interchangeably. The terms PTP leg and PTP path may be used herein interchangeably. The terms PTM leg and PTM path may be used herein interchangeably. The terms multicast service and multicast session may be used herein interchangeably. The terms MBS service and MBS session may be used herein interchangeably. The terms multicast session and MBS session may be used herein interchangeably.

A retransmission of MBS traffic may be sent, for example, over one of three mechanisms:

PTP retransmission scheme: Retransmitted transport block may use a UE-specific PDCCH with a CRC scrambled by a UE specific RNTI (e.g., C-RNTI) that schedules a UE-specific PDSCH that is scrambled with the same UE-specific RNTI. Hereinafter this may also be referred to as a PTP ReTx scheme or a PTP scheme.

PTM retransmission scheme 1: Retransmitted transport block uses a group-common PDCCH with a CRC scrambled by a group-common RNTI to schedule a group-common PDSCH that is scrambled with the same group-common RNTI. Hereinafter this may also be referred to as a PTM ReTx Scheme 1 or a PTM scheme 1.

PTM transmission scheme 2: Retransmitted transport block uses a UE-specific PDCCH with a CRC scrambled by a UE-specific RNTI (e.g., C-RNTI) to schedule a group-common PDSCH that is scrambled with a group-common RNTI. Hereinafter this may also be referred to as a PTM ReTx Scheme 2 or a PTM scheme 2.

A procedure for Multiplexed MBS traffic provides solutions to problem 1 as described above. A network may be allowed to multiplex MBS traffic from different MBS services. This multiplexing may be performed at the SDAP layer and the MAC layer. Note that the gNB may either have a single SDAP entity for all MBS sessions, or it may have multiple SDAP entities, one for each MBS session. Alternatively, a gNB SDAP entity may provide services for multiple MBS sessions. Similarly, a UE may have a single SDAP entity for all MBS sessions of interest, or it may have multiple SDAP entities, one for each MBS session the UE is interested in. Alternatively, a UE SDAP entity may provide services for multiple MBS sessions. After correctly decoding a transport block, the decoded MAC PDU is sent to the disassembly and demultiplexing entity. This transport block may contain logical channel information from multiple MBS services, some of which are not of interest to the UE.

Figure 3A:
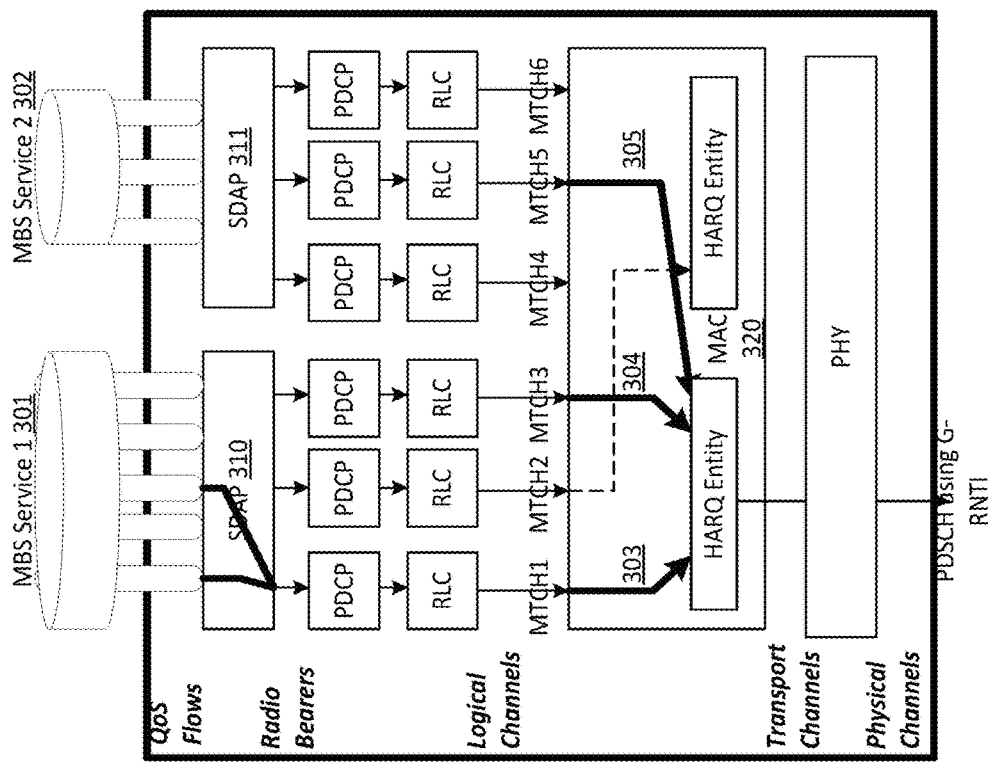
FIG. 3 shows an example of Multiplexing of MBS traffic.
Figure 3B:
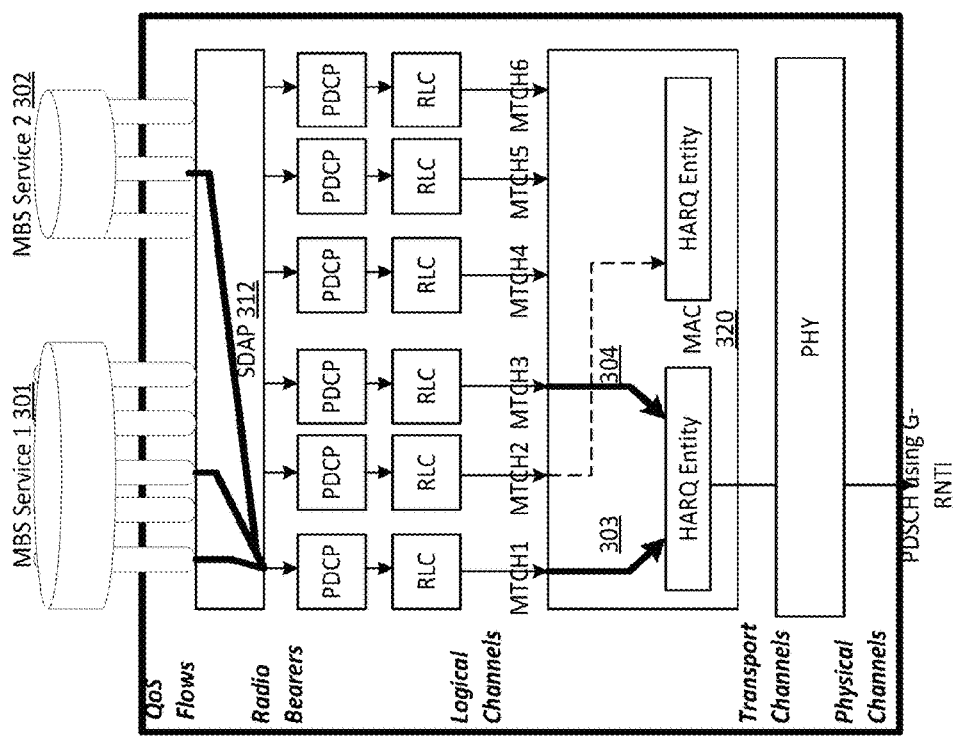

FIGS. 3A and 3B shows examples of multiplexing MBS traffic from different MBS services at either the SDAP or MAC layer 300. FIG. 3A shows an example of multiplexing MBS traffic from MTCH1 303, MTCH3 304, and MTCH5 305 at the MAC layer 320. FIG. 3B shows an example of multiplexing services from MBS service 1 301 and MBS service 2 302 at the SDAP layer 312. Accordingly, in FIGS. 3A and 3B, the network has multiplexed traffic from MBS service 1 301 and MBS service 2 302. The UE may only be interested in MBS service 1 301, and as a result, it is not interested in logical channel MTCH5 303. At the disassembly and demultiplexing entity, the UE needs to recover the MAC SDUs for each of the logical channels and discard any MAC SDUs related to logical channel MTCH5 303. To enable this functionality, the following alternatives may be used:

In a first alternative, the network may be able to guarantee that all logical channels multiplexed in a transport block have unique logical channel IDs (LCIDs). The UE may then be configured with LCIDs related to the MBS services of interest (for example the Logical Channel configuration may include a list of LCIDs corresponding to the MBS services of interest). Then, upon disassembling the MAC PDU, logical channels that are not on this list are discarded by the disassembly and demultiplexing entity.

In a second alternative, the network may not be able to guarantee that all logical channels multiplexed in a transport block have unique logical channel ID, for example logical channels from different MBS services may have the same LCID. In this case, the MAC PDU may need to include an additional identifier for each MAC SDU to allow the UE to determine if the SDU is for a logical channel corresponding to an MBS service of interest. For example, the MAC PDU header may include a MBS service ID (such as the TMGI or session ID or some alternative ID that identifies the MBS service). The UE may obtain a list of MBS service IDs that it is interested in during the UE configuration. Upon receiving and decoding a MAC PDU, the UE forwards the MAC PDU to the disassembly and demultiplexing entity. Then, upon disassembling the MAC PDU, MAC SDUs that have a MBS Service ID that is not on the configured list, are discarded.

In a third alternative, the UE may be configured with a list of MBS service IDs, indexed from 0 to maxMBSServices−1. The DCI scheduling the G-RNTI may contain the index of the MBS Service ID in a bit field. For example, an 8-bit field may carry an indication whether MBS Service with index k is carried in the transport block (a '1' in bit k of the field indicating that MBS service with index k is carried). Various options are possible in using this bit-field in the DCI.

UE PHY layer may be told the MBS services of interest. If the PHY layer, through the DCI, determines that the TB is not carrying an MBS service of interest, the UE need not try to decode the transport block UE PHY may indicate the presence of a downlink assignment and deliver the associated HARQ information to the HARQ entity along with the bit field. The HARQ entity could then evaluate if HARQ information contains data from an MBS service of interest.

If the UE configuration requires that the UE send HARQ feedback to the gNB, and the UE receives a transport block that has no MBS services of interest, the UE may be configured to always respond with an ACK, regardless if the transport block is correctly decoded, always respond with a DTX, regardless if the transport block is correctly decoded, or respond with a Don't Care (DC), regardless if the transport block is correctly decoded.

UE receiving MBS services may be configured with one or more G-RNTI. The UE may have zero, one, or more G-RNTI for services not requiring HARQ retransmissions. This may be typical for broadcast services as well as multicast services with less stringent QoS requirements. The UE may have zero, one, or more G-RNTI for services requiring HARQ retransmissions. In addition, if in RRC Connected, the UE may also have a unicast C-RNTI.

In such cases, a network may be allowed to multiplex MBS traffic from different MBS services, as well as unicast traffic. During the multiplexing and assembly phase, when allocating resources to the logical channels, there may be additional resources available. For example, a transport block may not be filled after including all MBS traffic for the services that may be multiplexed over this transport block. In such cases, the gNB may multiplex unicast traffic into this transport block. The unicast traffic being destined to a UE that is receiving the transport block. The multiplexing may be performed at the MAC layer.

Figure 4:
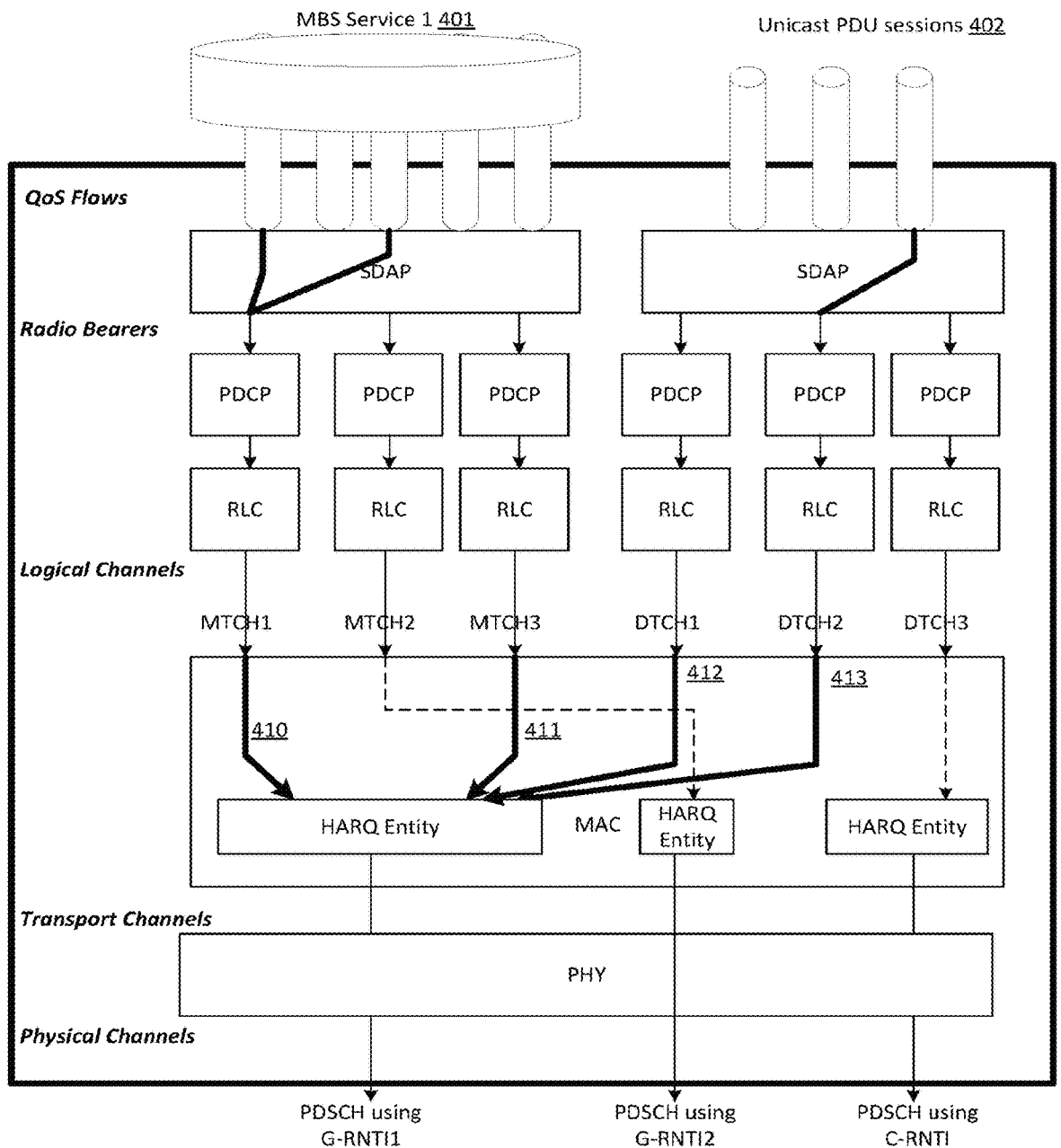
FIG. 4 shows an example of Multiplexing of MBS traffic and Unicast Traffic.

FIG. 4 shows an example where the transport block includes MBS traffic as well as unicast traffic 400. In this example, the transport block includes MBS traffic from MBS Service 1 401 via MTCH1 410 and MTCH3 411. This example also shows the transport block may comprise unicast traffic from unicast PDU sessions 402 to UE1 (logical channel DTCH1 412) as well as unicast traffic to UE2 (logical channel DTCH2 413). Not all UEs may support multiplexing unicast logical channels with multicast logical channels. A UE may share with the network its support of multiplexed unicast and MBS traffic over a single transport block. This information may be provided to the network through: subscription, UE capability transfer, or a new dedicated RRC MBS capability transfer.

After correctly decoding a transport block, the decoded MAC PDU may be sent to the disassembly and demultiplexing entity. This transport block may contain logical channel information from multiple MBS services, as well as zero or more unicast logical channels. At the disassembly and demultiplexing entity, the UE may recover the MAC SDUs for each of the logical channels carried in the transport block and may discard any MAC SDUs related to MBS logical channels from services that are not of interest. The UE may use the alternatives described above. In addition, the UE may discard any MAC SDU from unicast logical channels for services that are not destined for this UE. To enable this latter functionality, one or more of the following alternatives may be used by the UE.

In a first alternative, the network may include a field in the DCI to indicate if the transport block contains MBS logical channels, unicast logical channels, or both multicast and unicast logical channels. If the UE has no unicast logical channels configured, it may immediately discard all unicast logical channels that it receives in the transport block.

In a second alternative, the network may include fields in the DCI to indicate the identity of the logical channel that is multiplexed. This identity may be the LCID or some other identifier known to both the network and the UE. Upon receiving the DCI, the UE may determine if the transport block contains MBS logical channels from services that are of interest as well as unicast logical channels for services that are destined for this UE.

In a third alternative, the network may include fields in the DCI to indicate the UE ID of the recipient of logical channel that is multiplexed. This UE ID may be the G-RNTI, C-RNTI, or some other identifier known to both the network and the UE. Upon receiving the DCI, the UE may determine if the transport block contains MBS logical channels from services that are of interest as well as unicast logical channels for services that are destined for this UE. As an alternative for the UE ID, an index to a list of UE IDs may be used. The gNB may determine the identity of the UEs that are the target of a transport block transmitted over a G-RNTI for services requiring HARQ retransmissions. The gNB also may determine which of these UEs may be capable of receiving transport blocks with multiplexed unicast and MBS traffic. The gNB further may determine which of these are in RRC Connected and have a C-RNTI. A transmission to the G-RNTI may be received by all the UEs identified by these C-RNTI. The network may maintain an indexed list of these C-RNTI. The UE may be configured with the index in this list corresponding to its C-RNTI. Subsequently, when transmitting a multiplexed transport block over the G-RNTI, the DCI scheduling the transport block may include a bitmap that has the index of the UEs that have unicast traffic multiplexed in this transport. For example, if bit 'k' in the bitmap is 1, this indicates that UE identified with index 'k' has a unicast logical channel multiplexed in the transport block.

In a fourth alternative, the network may include new fields in the MAC header to help identify the multiplexed logical channels. For example, the MAC header may include a UE ID field and logical channel ID (LCID) field, for each multiplexed logical channel.

Figure 5:
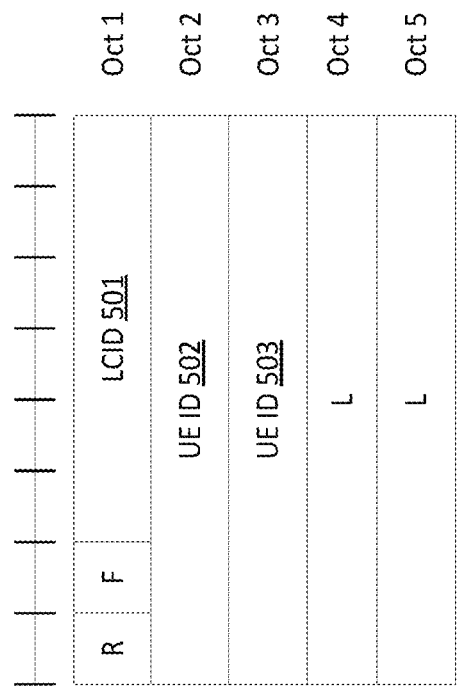
FIG. 5 shows an example of New MAC Header.

FIG. 5 shows an example MAC header 500. The example of FIG. 5 shows LCID field 501, UE ID field 502 and UE ID field 503. The UE ID field 502, 503 may identify the recipient of a logical channel. This may be a G-RNTI or C-RNTI, or some other identifier that is known to both the network and the UE. The logical channel identity may be the LCID or some other identifier known to both the network and the UE. Upon receiving a transport block, the disassembly and demultiplexing entity may determine if the logical channel corresponds to MBS traffic or unicast traffic. For MBS traffic, the disassembly and demultiplexing entity may determine if MBS traffic is for a service of interest. For unicast traffic, the disassembly and demultiplexing entity may use the UE ID field to determine if the UE is the recipient of this logical channel. If yes, UE may continue to process the logical channel. If no, the logical channel may be discarded. As an alternative, the MAC header may include a multicast/unicast field for each multiplexed logical channel. The multicast/unicast field may be a 1-bit indication (e.g., '0'=multicast and '1' for unicast). The UE ID may be included only for the logical channels for which the multicast/unicast field indicates that the traffic is unicast traffic. As an alternative to the UE ID, an index to a list of UE IDs may be used. The gNB may determine the identity of the UEs that are the target of a transport block transmitted over a G-RNTI for services requiring HARQ retransmissions. The gNB also may determine which of these UEs may be capable of receiving transport blocks with multiplexed unicast and MBS traffic. The gNB further may determine which of these are in RRC Connected and have a C-RNTI. A transmission to the G-RNTI may be received by all the UEs identified by these C-RNTI. The network may maintain an indexed list of these C-RNTI. The UE may be configured with the index in this list corresponding to its C-RNTI. Subsequently, when transmitting a multiplexed transport block over the G-RNTI, the MAC header may include a field to indicate if any unicast logical channels are multiplexed in the transport block. The MAC header may be a bitmap. For example, if bit 'k' in the bitmap is 1, this indicates that UE identified with index 'k' has a unicast logical channel multiplexed in the transport block.

Procedures for Logical Channel Prioritization at UE are described herein, which provides solutions to Problem 2. A UE may simultaneously be receiving MBS traffic and be involved with unicast reception and transmission as well sidelink reception and transmission. These UEs may be making unicast uplink transmissions and sidelink transmissions for both user plane data and control plane data. A UE may be (pre) configured with a priority list which allows it to determine which of the different unicast uplink transmissions and/or sidelink transmissions to prioritize when two or more of these transmissions overlap. This priority list may be based on the priority of the logical channels, the priority of the different MAC CEs, the priority of MAC CEs relative to certain logical channels, and whether the transmission is uplink or sidelink. In addition, a UE may also be required to transmit Uplink Control Information (UCI) to the gNB. This information may be transmitted over the PUCCH physical channel, or it may be multiplexed in the PUSCH physical channel.

When a UE is involved with MBS services, the UE may have a number of MBS related uplink transmissions (i.e. uplink transmission tied to MBS services). These MBS related uplink transmissions may include:

Uplink MCCH: MBS services may have an uplink MCCH for MBS related UL RRC messages, and the treatment of these RRC messages may be different on the UL.

Uplink MAC CEs: There may be MBS specific uplink MAC CEs to support certain features (e.g., request for a path switch).

PDCP status reports: a UE may send PDCP status reports to help with service continuity as a result of handover or an MRB (re) configuration.

PDCP control PDUs: a UE may send PDCP control PDU to support certain features.

RLC status reports: a UE may send RLC status reports for any MBS services transmitted over RLC-AM.

RLC control PDUs: a UE may send RLC control PDU to support certain features.

HARQ feedback: a UE may send HARQ feedback for an MBS service, if HARQ feedback is enabled for such services, and the UE may be required to send feedback.

In the following, the MBS traffic may be assigned a certain priority value. Hereinafter, it may be assumed that a lower priority value denotes traffic of a higher priority. However, the alternate interpretation may also be possible (i.e. a higher priority value denotes traffic of a higher priority). Furthermore, note that MBS traffic from multiple services may be multiplexed in each MBS transmission (multiplexed in a single transport block). Each of the multiplexed MBS logical channels may have a different priority. The priority value of the multiplexed traffic may correspond to priority value of the highest priority logical channel that may be multiplexed in the transport block. Alternatively, the priority value of the multiplexed traffic may correspond to a weighted average of the priority values of the MBS logical channels that are multiplexed in the transport block. The priority of the MBS related uplink transmission may correspond to the priority of the MBS traffic for which the uplink transmission is being transmitted. For example, if the MBS related uplink transmission is a PDCP status report for a MRB of priority value 'k', then the MBS related uplink transmission may also have the same priority value 'k'. Alternatively, the priority of the MBS related uplink transmission may be (pre) configured or fixed/standardized.

When the MBS related UL transmissions overlap with unicast UL transmissions or sidelink transmissions, and the UE may not be capable of simultaneous transmission, then one of these transmissions has to be prioritized over the other. The overlap may be a full overlap or a partial overlap. Another scenario may be two transmissions occur in the same slot without time domain, e.g., symbol level, overlapping, and the UE may not be capable of simultaneous transmission in this slot, then one of these transmissions has to be prioritized over the other. The following embodiments may be used to prioritize one transmission over another. Note that hereinafter, the term "overlap" may be used to denote the case where the transmission may have a full or partial overlap (that is the case where the transmissions occur over one or more same symbols), as well as the case that the transmissions occur over the same slot (or mini-slot), but where the transmissions do not occur over one the same symbols.

In a first embodiment, some transmission types are always prioritized over other transmission types. For example, MBS related uplink transmissions may always be de-prioritized with respect to the sidelink transmissions or the unicast uplink transmissions. Alternatively, the MBS related uplink transmissions may always be prioritized with respect to the sidelink transmissions or the unicast uplink transmissions.

In a second embodiment, the transmission that is prioritized may be based on the relative priorities of the MBS related uplink transmissions and the sidelink transmissions or the unicast uplink transmissions. In case of overlap, the UE may compare the priority of the overlapped traffic, and transmit the traffic with the higher priority. In case the overlapping traffic have the same priority, the UE may randomly decide which to prioritize, or may use any of the other embodiments described herein to decide which to prioritize or may rely on UE implementation.

In a third embodiment, the transmission that is prioritized may be based on the relative priorities of the MBS related uplink transmissions and a threshold (MBSPriorityThreshold). In case of overlap, the UE may compare the priority value of the MBS related uplink transmissions with the MBSPriorityThreshold. If the priority value is less than the MBSPriorityThreshold, the MBS related uplink transmission may be prioritized and transmitted. If the priority value is higher than the MBSPriorityThreshold, the MBS related uplink transmission may be de-prioritized and the sidelink transmission or the unicast uplink transmissions may be prioritized. If the priority value is equal to the MBSPriorityThreshold, the UE may randomly decide which to prioritize, or may use any of the other embodiments described herein to decide which to prioritize or may rely on UE implementation. Note that the value of MBSPriorityThreshold may be (pre) configured or fixed/standardized.

In a fourth embodiment, the transmission that is prioritized may be based on the relative priorities of the transmissions with respect to thresholds. Each of the UL/SL traffic types has a certain priority value and a priority threshold (MBSPriorityThreshold, ULPriorityThreshold, SLPriorityThreshold). In case of overlap between MBS related uplink transmissions and unicast uplink transmissions, the UE first checks the relative priority of the unicast uplink transmission by comparing its priority value to the ULPriorityThreshold. If the unicast uplink transmission has a high priority (priority value<=ULPriorityThreshold) the unicast uplink transmission may be prioritized. If the unicast uplink transmission has a low priority (priority value>ULPriorityThreshold) the UE relies on the relative priority comparison between the MBS related uplink transmissions and the unicast uplink transmission. The UE transmits the traffic of higher priority. In case of overlap between MBS related uplink transmissions and sidelink transmissions, the UE first checks the relative priority of the sidelink transmission by comparing its priority value to the SLPriorityThreshold. If the sidelink transmission has a high priority (priority value<=SLPriorityThreshold) the sidelink transmission may be prioritized. If the sidelink transmission has a low priority (priority value>SLPriorityThreshold) the UE relies on the relative priority comparison between the MBS related uplink transmissions and the sidelink transmission. The UE transmits the traffic of higher priority.

Some types of MBS related uplink transmission may not have an associated priority value. For example UL MCCH traffic and UL MAC CE traffic may not be associated with a priority value. For these types of MBS related uplink transmissions, the priority of this traffic may be fixed/standardized. A typical example may include the highest priority listed first as in the example list below. For example, the UL MCCH has highest priority amongst the MBS related uplink transmissions (higher priority than any MBS MAC CE, any PDCP status/control PDU, and any RLC status/control PDU). The relative priority of the MBS traffic with other unicast uplink traffic and sidelink traffic is also shown in the example list below.

C-RNTI MAC CE or data from UL-CCCH;
data from UL-MCCH;
Configured Grant Confirmation MAC CE or BFR MAC CE or Multiple Entry Configured Grant Confirmation MAC CE;
Sidelink Configured Grant Confirmation MAC CE;
MBS MAC CE;

LBT failure MAC CE;
MAC CE for SL-BSR prioritized according to TS 38.321 clause 5.22.1.6;
MAC CE for BSR, with exception of BSR included for padding;
Single Entry PHR MAC CE or Multiple Entry PHR MAC CE;
MAC CE for the number of Desired Guard Symbols;
MAC CE for Pre-emptive BSR;
MAC CE for SL-BSR, with exception of SL-BSR prioritized according to TS 38.321 clause 5.22.1.6 and SL-BSR included for padding;
data from any Logical Channel, except data from UL-CCCH;
MAC CE for Recommended bit rate query;
MAC CE for BSR included for padding;
MAC CE for SL-BSR included for padding.

Note that the above list is provided as an example. In one alternative to the above, the relative priority of the UL-MCCH and MBS MAC CE may be based on the type of MBS services being received by the UE. The UL-MCCH priority may be higher or lower depending on the MBS services being received by the UE. The MBS MAC CE priority may be based on the specific MAC CE command sent by the UE, with some commands having higher or lower priority Although shown as separate embodiments, it should be understood that these embodiments may be used in any combination, and may be targeting certain MBS related UL transmissions. For example, UL MCCH information may be prioritized over other UE transmissions, while MBMS related PDCP Status reports may prioritized based on the priority level of the MBR for which the status report is being sent.

Procedures for HARQ Retransmission over C-RNTI are described herein, which provides solutions to Problem 3 described above.

Figure 6:
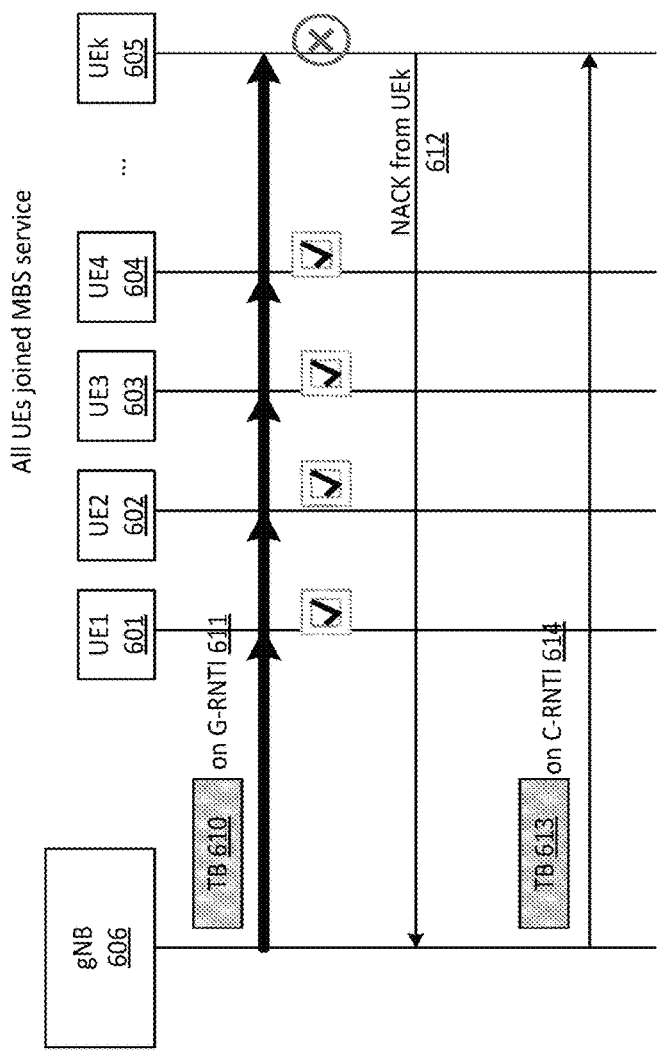
FIG. 6 shows an example of Initial Transmission on group radio network temporary identifier (G-RNTI) and HARQ Retransmission on C-RNTI.

FIG. 6 shows an example transmission of an MBS service with HARQ feedback enabled 600. In the example of FIG. 6, a plurality of UEs may have joined an MBS service (UE1 601, UE2 602, UE3 603, UE4 604, . . . . UEk 605) and have been configured with the MRB configuration for reception of the MBS service. HARQ feedback may also be enabled for this MBS service. A TB 610 may initially be transmitted from a gNB 606, over a G-RNTI 611 to the UEs (UE1 601, UE2 602, UE3 603, UE4 604, . . . . UEk 605). The transport block may be correctly received by the UEs interested in the service, except UEk 605. UEk 605 may send a NACK 612 back to the gNB 606. The other UEs (UE1 601, UE2 602, UE3 603, UE4 604) may send an ACK back to the gNB 606 (not shown in FIG. 6). As only UEk 605 has not received the TB 610, the gNB 606 may send the retransmission TB 613 only to UEk 605, using the C-RNTI 614 of UEk.605

At the UE, there may be a number of HARQ entities. Each of these may have multiple sets of HARQ processes. One set of DL HARQ processes for the unicast transmissions, one set of MBS HARQ processes for the MBS transmissions, and a broadcast HARQ process for the BCCH transmissions. There may also be another set of sidelink HARQ processes for the SL transmission, and these may be in a separate HARQ entity. In one example, the same MBS HARQ process may handle all transmissions of a single transport block, regardless of whether the transport block is received over the G-RNTI or over the C-RNTI.

Figure 7:
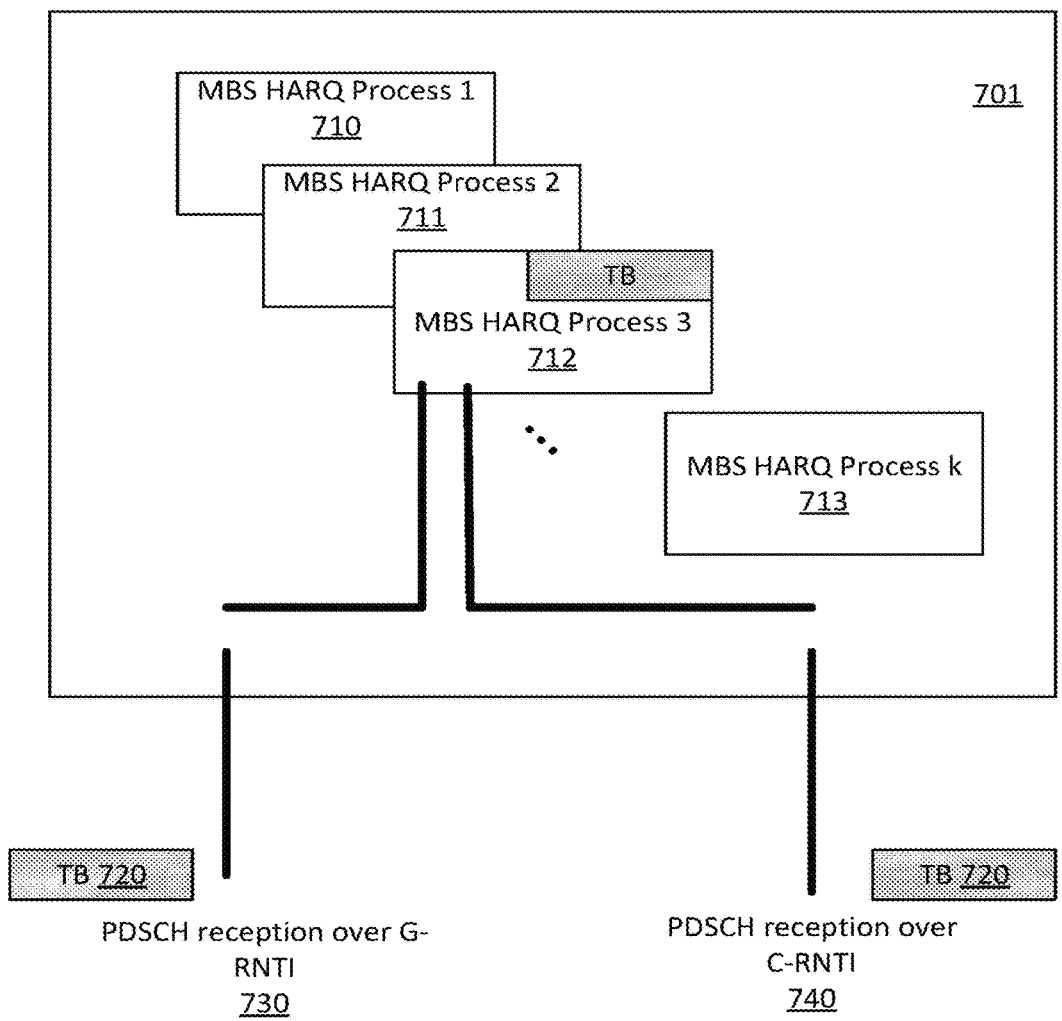
FIG. 7 shows an example of MBS HARQ Process Alternative.

FIG. 7 shows an example where the MBS transmissions of a TB are handled by the same MBS HARQ process 700. As shown in FIG. 7, HARQ entity 701 may comprise MBS HARQ Process 1 710, MBS HARQ Process 2 711, MBS HARQ Process 3 712, . . . . MBS HARQ Process k 713. MBS HARQ Process 3 712 may handle the transmissions of TB 720 including a PDSCH reception over G-RNTI 730 and a PDSCH reception over C-RNTI 740.

The DCI scheduling the PDSCH may comprise one or more of the following:
HARQ process ID: an identifier for the HARQ Process that should handle the received transport block;
G-RNTI/C-RNTI indication: an indication if the PDSCH is being received over the G-RNTI or C-RNTI;
NDI: a New Data Indicator to indicate if the transport block is a first transmission;
MBS HARQ process indicator: an indication if the HARQ process ID corresponds to the an MBS HARQ process or a DL HARQ process;
MBS indicator: an indication that the transport block carries MBS traffic.

In order to receive the retransmissions, the UE may monitor the C-RNTI. However, it may not be clear as to when the UE has to monitor the C-RNTI-always or only when it expects a potential retransmission from the gNB on the C-RNTI. The UE has many options for monitoring the C-RNTI.

The UE may always monitor C-RNTI for potential MBS retransmissions from the gNB if the UE is in RRC Connected mode.

The UE may monitor C-RNTI for potential MBS retransmissions from the gNB if the UE is in RRC Connected mode and during the periods where MBS activity may be expected (for example, during the MBS DRX active periods).

The UE may monitor C-RNTI for potential MBS retransmissions from the gNB if the UE is in RRC Connected mode and during the periods where MBS activity is expected (for example, during the MBS DRX active periods). Furthermore, if during these MBS DRX active periods, no other DL activity may be expected (for example UE may be in DRX for unicast transmissions), then the UE may monitor C-RNTI for potential MBS retransmissions from the gNB, only after sending a NACK as the HARQ feedback for a transport block transmission or retransmission.

The UE may always monitor C-RNTI for potential MBS retransmissions from the gNB, regardless of state (RRC Idle, RRC Inactive, RRC Connected).

The UE may monitor C-RNTI for potential MBS retransmissions from the gNB, in all states and during the periods where MBS activity may be expected. For example during the MBS DRX active periods.

The UE may monitor C-RNTI for potential MBS retransmissions from the gNB, in all states and during the periods where MBS activity may be expected. For example during the MBS DRX active periods. Furthermore, if during these MBS DRX active periods no other activity is expected (for example UE may be in DRX for unicast transmissions), then the UE may monitor C-RNTI for potential MBS retransmissions from the gNB, only after sending a NACK as the HARQ feedback for a transport block transmission or retransmission.

The UE may monitor the C-RNTI for potential MBS retransmissions from the gNB, while in RRC Idle and RRC Inactive, during the periods where MBS activity may be expected. For example during the MBS DRX active periods.

The UE may monitor C-RNTI for potential MBS retransmissions from the gNB, while in RRC Idle and RRC Inactive, only after sending a NACK as the HARQ feedback for a transport block transmission or retransmission.

Upon reception of the DCI, the UE may be able to determine whether the transport block is received over a G-RNTI or C-RNTI.

If G-RNTI, the UE forwards the transport block to the identified MBS HARQ process.

If C-RNTI, the UE may need to first determine if the transport block corresponds to MBS traffic and needs to be sent to an MBS HARQ process, or whether the transport block corresponds to a DL unicast transmission and needs to be sent to a DL HARQ process. It may use the MBS indicator to determine if the transport block corresponds to MBS traffic or DL unicast traffic. Alternatively, the UE may implicitly determine this based on the presence or absence of the G-RNTI/C-RNTI indication. For example, if the G-RNTI/C-RNTI indication is present, the UE may assume that the transport block corresponds to MBS traffic. If the G-RNTI/C-RNTI indication is not be present, the UE may assume that the transport block corresponds to DL unicast traffic. In another example, the UE may use the MBS HARQ process indicator to determine if the HARQ process is an MBS HARQ process or a DL HARQ process. If the indicator suggests an MBS HARQ process, the UE may forward the transport block to the identified MBS HARQ process. For example, if the indicator suggests a DL HARQ process, the UE may forward the transport block to the identified DL HARQ process. Alternatively, to the MBS HARQ process indicator, the network and UE may be configured so that the HARQ process IDs for each of the HARQ processes is different. For example DL HARQ process IDs may be in the range 0 . . . 15, and the MBS HARQ process IDs may be in the range 16 . . . 32. The actual ranges may be part of the MRB configuration. In such a case, the HARQ process ID implicitly tells the UE if the transport block is to be handled by a DL HARQ process or an MBS HARQ process.

In cases where a transport block is transmitted over both G-RNTI and C-RNTI, and these are handled by the same HARQ process, there may be cases where the network starts transmitting a new transport block over G-RNTI using the same HARQ process. Effectively this results in HARQ process collisions. In such cases, the UE may receive transport block A over C-RNTI (a retransmission) and transport block B over G-RNTI (a new transmission). Both these transport blocks are destined to be handled by the same MBS HARQ process. To resolve the HARQ process collision issue the UE may use one or any combination of the following HARQ process collision approaches:

In a first HARQ process collision approach, the UE may consider only the transport block received over the C-RNTI and discard the transport block received over the G-RNTI.

In a second HARQ process collision approach, the UE may consider only the transport block received over the G-RNTI. The UE may flush the HARQ process and consider the G-RNTI as a new transmission In a third HARQ process collision approach, the UE may process the transport block received over the C-RNTI and temporarily store the transport block received over the G-RNTI. The UE may move the temporarily stored transport block to the HARQ process: once the transport block is successfully decoded; once a timer expires; once a configured maximum number of retransmissions have been received; once the UE receives an indication in the DCI scheduling the TB over C-RNTI.

In a fourth HARQ process collision approach, after sending a NACK for a transport block received over the G-RNTI, the UE may start monitoring only the C-RNTI. In such a case, the UE may not monitor the G-RNTI if it is receiving retransmissions over the C-RNTI. The UE may resume monitoring the G-RNTI: once the transport block is successfully decoded; once a timer expires; once a configured maximum number of retransmissions have been received; once the UE receives an indication in the DCI scheduling the TB over C-RNTI.

In another example, a different MBS HARQ process may be used for the same transport block-one MBS HARQ process if the transport block is received over the G-RNTI and a second MBS HARQ process if the transport block is received over the C-RNTI.

Techniques for sending a PDCP status report are described herein, which provides solutions to Problem 4 described above. After a handover, the UE may be missing certain PDCP SDUs. For services requiring reliability and service continuity, the receiving entity may send a PDCP status report to the transmitting entity so that the transmitting entity may be aware of which PDCP SDUs requiring retransmission. According to TS38.323, for AM DRBs configured by upper layers to send a PDCP status report, the receiving PDCP entity may trigger a PDCP status report when:

Upper layer requests a PDCP entity re-establishment;
Upper layer requests a PDCP data recovery;
Upper layer requests an uplink data switching;
Upper layer reconfigures the PDCP entity to release DAPS and daps-SourceRelease may be configured as described in TS 38.331.

For UM DRBs configured by upper layers to send a PDCP status report in the uplink, the receiving PDCP entity may trigger a PDCP status report when upper layer requests an uplink data switching.

The PDCP status report mechanism may be extended to provide lossless handover for MBS services, as well as lossless dynamic PTM-PTP switching and lossless MRB reconfiguration. Adding the following new triggers is proposed for sending the PDCP status report:

After expiry of a timer;
When the UE detects missing PDCP PDUS;
After an MBS radio bearer reconfiguration;
After an MBS radio bearer reconfiguration and the UE detects missing PDCP PDUs;
After a PTM-PTP switch;
After a PTM-PTP switch and the UE detects missing PDCP PDUs;
After a PTP-PTM switch;
After a PTP-PTM switch and the UE detects missing PDCP PDUs;
When the PDCP reordering timer expires;

An MBS radio bearer configuration may include a change in the type of an MRB. Examples of MRB bearer type changes include but are not limited to a PTM-PTP switch, a PTP-PTM switch, or a change in the type of MRB.

When the UE is triggered to send a PDCP status report, the MRB may not have an UL path (over RLC AM or over RLC UM) for sending this report. In the following, new mechanisms are proposed on how to send PDCP status report.

PDCP layer may notify higher layers (RRC or NAS) of the need to send the status report. The higher layers may request the establishment of an uplink path for the MRB. For example, the gNB may reconfigure the MRB with an RLC AM PTP leg. Alternatively, the UE may include the PDCP status report inside the RRC or NAS layer message sent to the network.

The gNB may always configure the UE with an UL path if it can determine that the UE may need to send PDCP status report.

The UE may include the PDCP status report on a linked radio bearer that has an uplink path. The UE may be provided with the identity of the linked radio bearer at configuration of the MRB. If the UE needs to send a PDCP status report for this MRB, it may be sent via the linked radio bearer.

The UE may send the PDCP status report over the RACH

The UE may include the PDCP status report over the PTP leg of another MRB split bearer. The UE may be provided with the identity of the split bearer at configuration of the MRB.

Solutions to Problem 5: Procedures for a UE joining an already started/activated Multicast Session are described herein, which provides solutions to problem 5 described above. Note that the problem may be described as a UE joining an already activated/started multicast session. The embodiments presented focus on the case where a UE receives an MBS configuration, while the MBS service may be already started/activated. However, it should be understood that the embodiments are more generally applicable to any case that a UE starts reception of MBS traffic for a service that may be already in operation. For example, the same embodiments may be applied for the case that a UE does a path switch from a PTP leg to a PTM leg. For example, the same embodiments may be applied for the case that a PTM leg of a split bearer or PTM radio bearer may be reconfigured.

Figure 8:
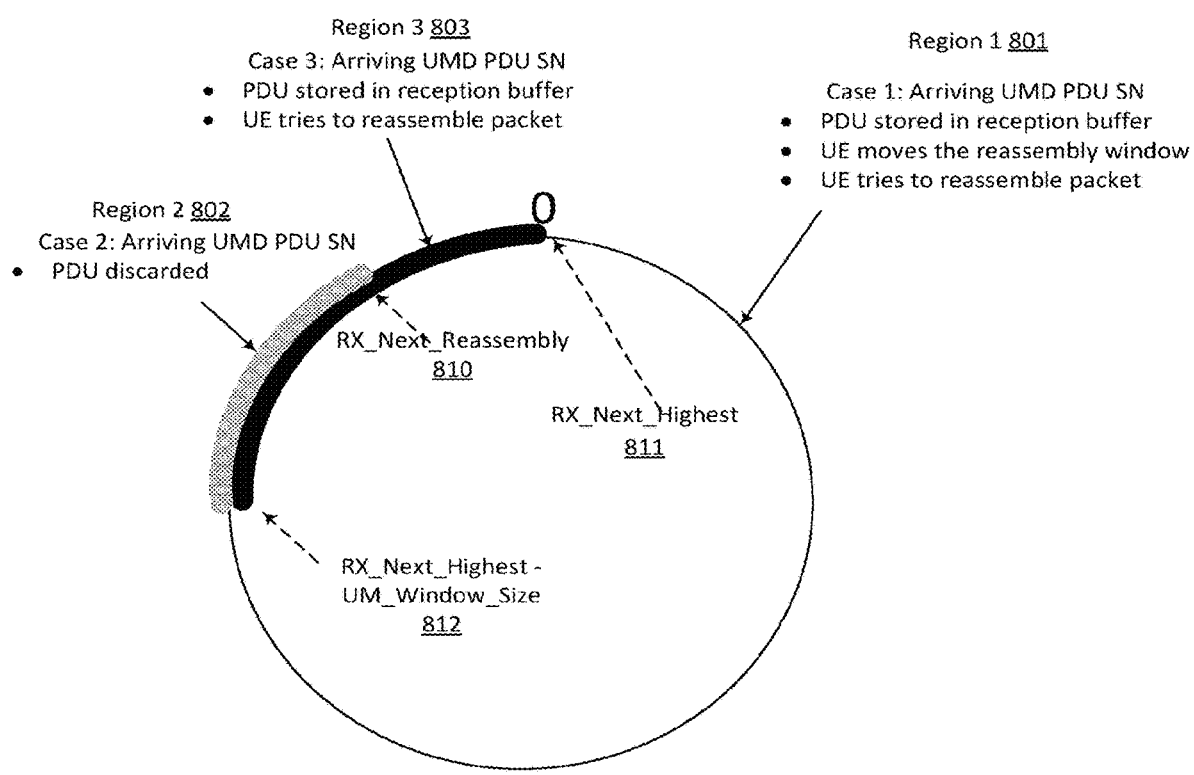
FIG. 8 shows an example RLC UM Window.

MRB with a PTM leg configured with RLC-UM is described herein. Any PTM leg (e.g., an MRB with a single PTM leg or a split bearer with a PTP leg and an PTM leg) may be configured with RLC-UM. For RLC-UM transmissions, the transmitting side may add a sequence number. For example for NR, the RLC-UM adds sequence numbers for all segmented RLC SDUs. The same sequence number may be added for each of the segments of an RLC SDU. At the receiving side, the RLC-UM may maintain a reassembly window to allow the rebuilding of the segmented PDUs. The window may be maintained through two state variables: RX_Next_Highest and RX_Next_Reassembly, along with a window size: UM_Window_Size. Initially both RX_Next_Highest and RX_Next_Reassembly are set to 0. The reassembly window may be defined as: (RX_Next_Highest-UM_Window_Size)<=SN<RX_Next_Highest FIG. 8 shows an example where because of the modulo operation to the SN, the reassembly window is often shown over a circular number space 800. FIG. 8 shows the window may be maintained through the two state variables RX_Next_Highest 811 and RX_Next_Reassembly 810, along with RX_Next_Highest–UM_Window_Size 812. In the example of FIG. 8, the window moves as the receiving entity receives a UMD PDU with a SN outside the reassembly window. For example, if the receiving entity obtains a SN=x which may be outside the reassembly window (region 1 801), the receiving entity sets RX_Next_Highest=x+1 (effectively moving the window). The receiving entity also maintains RX_Next_Reassembly 810 to denote the SN of the next RLC SDU that may be awaiting reassembly. If the receiving entity obtains a SN=x which may be inside the reassembly window, it can be in one of 2 regions (region 2 802 or region 3 803), Any UMD PDU received by the receiving entity which has a SN between (RX_Next_Highest–UM_Window_Size 812) <=SN<RX_Next_Reassembly 810 may be in region 2 802. This UMD PDU belongs to an RLC SDU that has already been reassembled by the receiving entity and forwarded to upper layers, and as a result, this UMD PDU may be discarded.

Any UMD PDU received by the receiving entity which has a SN between RX_Next_Reassembly 810<=SN<RX_Next_Highest 811 may be in region 3 803. This UMD PDU may be stored in the reception buffer, and the UE may attempt to reassemble the RLC PDU. If all segments have been received, the RLC PDU may be forwarded to the upper layers.

One specific problem occurs when the UE is initially configured with RLC UM, and the UE starts with the initial values of RX_Next_Reassembly and RX_Next_Highest (i.e., set to 0). For such an initial setting, region 2 802 and region 3 803 completely overlap. As the MRB may be already in operation, the UE may be unaware of which SN may be currently being transmitted by the gNB. When the UMD PDU arrives to the RLC-UM entity, it can have any SN. If this SN falls in region 2 802, this UMD PDU may be discarded-which may not clearly be the intended behavior. Although the UE RLC UM may eventually synchronize with the gNB RLC UM, until this happens, many segmented UMD PDUs may be discarded. To address this problem the following embodiments are proposed.

In a first embodiment, as part of the MRB configuration of the UE RLC UM, the UE may be provided with the values of the initial values for RX_Next_Reassembly 810 and RX_Next_Highest 811. For example, the gNB could set these to the value of the SN of the last the RLC SDU that was segmented. Or the gNB could set these to the value of the SN of the next RLC SDU that may be segmented. Upon receiving the configuration, the UE may set up the reassembly window based on the configured values of RX_Next_Reassembly 810 and RX_Next_Highest 811.

In a second embodiment, the UE RLC UM could set the value of RX_Next_Reassembly 810 and RX_Next_Highest 811 to the value of the SN of the first received UMD PDU. For example, after MRB configuration, the UE may not set up the reassembly window (not set up values for RX_Next_Reassembly 810 and RX_Next_Highest 811). Upon receiving the first UMD PDU for the MRB, the RLC UM may extract the SN=x, and set RX_Next_Reassembly=x and RX_Next_Highest=x. As a result, the reassembly window may be set up upon reception of the first UMD PDU.

In a third embodiment, the gNB may periodically send a control PDU which contains the value of the SN of the last the RLC SDU that was segmented by the gNB. Alternatively the gNB may periodically send a control PDU which contains the SN of the next RLC SDU that may be segmented. UE RLC UM would receive this control PDU and recover the SN information to initialize or re-initialize RX_Next_Reassembly 810 and RX_Next_Highest 811 to the value of the SN contained in the control PDU.

In a fourth embodiment, each unsegmented UMD PDU transmitted by the gNB may include in its header, the value of the SN of the last RLC SDU that was segmented by the gNB. Alternatively, each unsegmented UMD PDU transmitted by the gNB may include in its header, the SN of the next RLC SDU that may be segmented. The UMD PDU may contain an indication that the UMD PDU includes a SN and that the UMD PDU contains a complete RLC SDU (no segmentation). This indication may allow the UE to know that the UMD PDU contains a SN in the header, that corresponds to the value to be used by the UE to (re) initialize RX_Next_Reassembly 810 and RX_Next_Highest 811.

In a fifth embodiment, the UE does not perform any special processing for UMD PDUs received in region 2 802. That is, if a UMD PDU may be received and its SN may be in region 2 802, the UE does not discard the UMD PDU, but rather stores it in the reception buffer. UMD PDUs are only discarded when the reassembly window moves, and UMD PDUs fall out of the reassembly window.

In an alternative to any of these five embodiments, the UE may discard any RLC SDU segment received which may not be an initial segment, and this up to the time the UE receives a first initial segment. When a UE first starts receiving the MBS traffic of an ongoing MBS session, the gNB may have already completed its transmission of the first segments of an RLC SDU. As a result, these segments may not be received by the UE, and as a result the UE may never be able to reassemble the RLC SDU. In such cases, any UMD PDU received for this RLC SDU may be discarded immediately. The UE may use the Segmentation Info (SI) field and/or the Segment Offset (SO) field in the UMD PDU header to determine if the UMD PDU is an initial segment. The UE may continue this up until an initial segment for any RLC SDU that is received.

An MRB with a PTM leg configured with RLC-AM is described herein. Any PTM leg (e.g., an MRB with a single PTM leg or a split bearer with a PTP leg and an PTM leg) may be configured with RLC-AM. For RLC-AM transmissions, the transmitting side may add a sequence number for each RLC SDU. If any RLC SDU is segmented, the transmitting side also may add an indication of which bytes of the original RLC SDU are contained in the segment. All this information is contained in the AMD PDU header. In addition, the receiving side may send an RLC status report to the transmitting entity to notify the transmitting entity to retransmit certain AMD PDUs.

Figure 9:
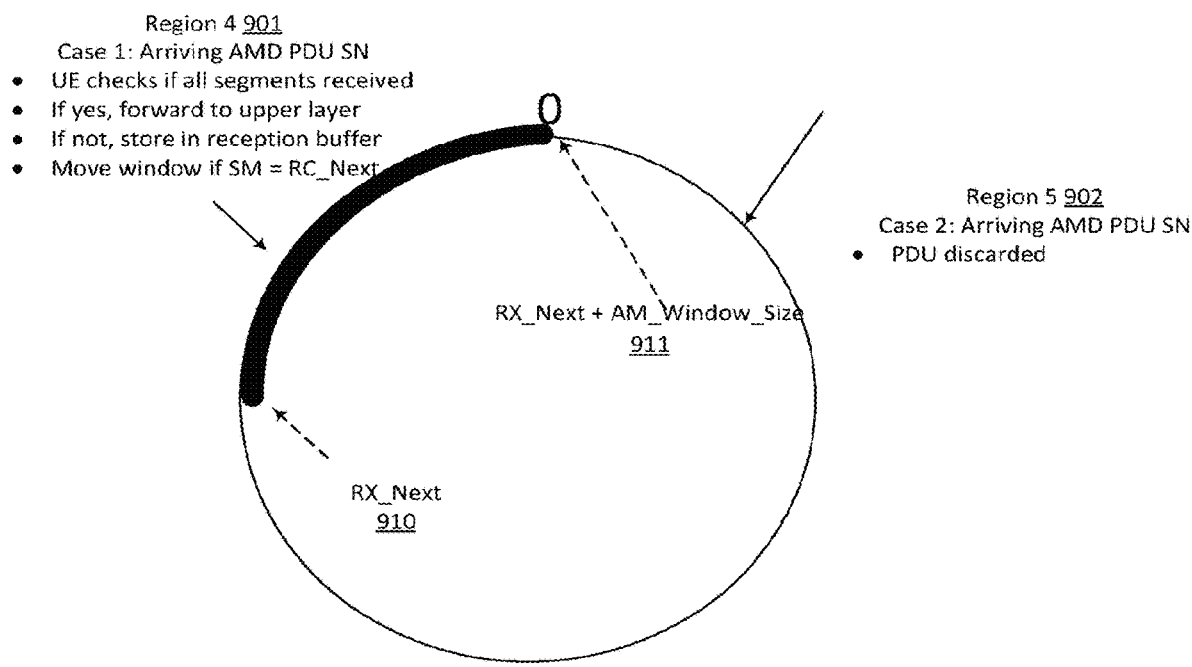
FIG. 9 shows an example RLC AM Window.

FIG. 9 shows another example where at the receiving side, the RLC-AM maintains a receiving window to allow the rebuilding of the segmented PDUs as well as to allow sending status report information to the transmitting side 900. The window may be maintained through a state variable: RX_Next 910 along with a window size: AM_Window_Size. Initially RX_Next may be set to 0. The receiving window may be defined as:

$$RX\_Next <= SN < RX\_Next + AM\_Window\_Size \quad 911$$

Any time a UE receives an AMD PDU with SN inside the receiving window (region 4 901), it may check if it has all segments for this RLC SDU. If yes, it may forward the RLC SDU to upper layers. If not, the UE may store the AMD PDU in the reception buffer, may check to see if all segments of the RLC SDU have been received, and may check if the receiving window can be moved. The lower edge of the window may denote the SN of the next RLC SDU that is to be received and sent to upper layers. The window moves when the receiving entity receives all segments for the RLC SDU with SN=RX_Next 910. In such a case, the lower edge may be set to the next SN that is expected.

Any time a UE receives an AMD PDU with SN outside the receiving window (region 5 902), the AMD PDU may be discarded.

One specific problem occurs when the UE may initially be configured with RLC AM, and the UE starts with the initial values of RX_Next set to 0. For such an initial setting, the receiving window may be fixed from $$0 <= SN < AM\_Window\_Size$$

As the MRB is already in operation, the UE may be unaware of which SN is currently being transmitted by the gNB. When the AMD PDU arrives to the RLC-AM entity, it can have any SN. If this SN falls in region 5 902, this AMD PDU may be discarded, which may not clearly be the intended behavior. Although the UE RLC AM may eventually synchronize with the gNB RLC AM, until this happens, many AMD PDUs may be discarded. To address this problem the following embodiments are proposed.

In a first embodiment, as part of the MRB configuration of the UE RLC AM, the UE may be provided with the value of the initial value for RX_Next 910. For example, the gNB may set this to the value of the SN of the last the RLC SDU that was transmitted. Or the gNB may set these to the value of the SN of the next RLC SDU that may be transmitted. Upon receiving the configuration, the UE may set up the receiving window based on the configured values of RX_Next 910.

In a second embodiment, the UE RLC AM may set the value of RX_Next 910 to the value of the SN of the first received AMD PDU. For example, after MRB configuration, the UE may not set up the receiving window (e.g., not set up values for RX_Next 910). Upon receiving the first AMD PDU for the MRB, the RLC AM may extract the SN=x, and set RX_Next=x. As a result, the receiving window may be set up upon reception of the first AMD PDU.

In a third embodiment, the gNB may periodically send a control PDU which contains the value of the SN of the lower edge of the gNB transmit window. Alternatively, the gNB may periodically send a control PDU which contains the SN of the lower edge of the gNB transmit window. The UE RLC AM may receive this control PDU and recover the SN information to initialize or re-initialize RX_Next 910 to the value of the SN contained in the control PDU.

In a fourth embodiment, each AMD PDU transmitted by the gNB may include in its header, the value of the SN of the lower edge of the gNB transmit window. Alternatively, each AMD PDU transmitted by the gNB may include in its header, the SN of the lower edge of the gNB transmit window. The AMD PDU may contain an indication that the AMD PDU includes two SNs. This indication may allow the UE to know that the AMD PDU contains a first SN identifying SN of the RLC SDU being transmitted and a second SN identifying the lower edge of the gNB transmit window. The UE would use this second SN, to (re) initialize RX_Next 910.

In an alternative to any of these four embodiments, the UE may discard any RLC SDU segment received which may not be an initial segment, and this up to the time the UE receives a first initial segment. When a UE first starts receiving the MBS traffic of an ongoing MBS session, the gNB may have already completed its transmission of the first segments of an RLC SDU. As a result, these segments may not be received by the UE, and as a result the UE may never be able to reassemble the RLC SDU. In such cases, any AMD PDU received for this RLC SDU may be discarded immediately. The UE may use the Segmentation Info (SI) field and/or the Segment Offset (SO) field in the UMD PDU header to determine if the AMD PDU is an initial segment. The UE may continue this up until an initial segment for any RLC SDU may be received.

MRBs with PDCP reordering is described herein. The PDCP may guarantee that traffic may be delivered in order to higher layers, if required by the service. In order to enable this functionality, the PDCP layer may maintain two variables RX_NEXT and RX_DELIV and may use a reception buffer to store PDCP PDUs while waiting to deliver these in order. The UE may calculate the RCVD_COUNT for each received PDCP PDU. The RCVD_COUNT may be based on a Hyper Frame Number (HFN) as well as the SN of the received PDCP PDU. The variable RX_NEXT may comprise the COUNT value of the next PDCP PDU expected to be received. The initial value may be 0. For example, upon reception of a PDCP PDU with COUNT=x, RX_NEXT may be set to x+1. The variable RX_DELIV may denote the COUNT value of the last PDCP PDU that was delivered by the PDCP to higher layers. This may be the COUNT value of the last in-order delivered PDCP PDU.

A PDCP entity may be waiting for PDCP PDUs with COUNT values greater than RX_DELIV. Any received PDCP PDU with a COUNT value less than RX_DELIV may be assumed to have been already received and delivered. As a result, these PDCP PDUs may be discarded by the PDCP layer.

One specific problem occurs when the PDCP at the UE is initially configured, and the UE starts with the initial values of RX_NEXT and RX_DELIV set to 0. As the MRB may be already in operation, the UE may be unaware of the TX_NEXT value associated with the PDCP being transmitted by the gNB. This TX_NEXT value corresponds to a HFN1 and a SN1. When the PDCP PDU arrives to the PDCP entity, it can have any SN1 value. If the UE assumes that HFN starts at 0, then when it determines the COUNT value, this value may be less than RX_DELIV. In such a case, the PDCP PDU may be discarded, which may not clearly be the intended behavior. Although the UE PDCP may eventually synchronize with the gNB PDCP, until this happens, many PDCP PDUs may be discarded. To address this problem the following embodiments are proposed.

In a first embodiment, as part of the MRB configuration of the UE PDCP, the UE may be provided with the initial value for RX_NEXT and/or RX_DELIV. For example the gNB could set this to the value of the TX_NEXT of the last the PDCP PDU that was transmitted. Or the gNB could set these to the value of the TX_NEXT of the next PDCP PDU that may be transmitted. Upon receiving the configuration, the UE may set up the variables based on the received configuration. Alternatively, the MRB configuration may contain the value of TX_NEXT. In another example, the MRB configuration may contain a separate configuration for HFN and SN. The gNB may be set these according to:
  HFN: set to the HFN part (i.e., the number of most significant bits equal to HFN length) of TX_NEXT;
  SN: set to the SN part (i.e., the number of least significant bits equal to PDCP SN length) of the TX_NEXT.

The UE may then determine the initial values of RX_NEXT and/or RX_DELIV based on the configured HFN and SN. For example:
  RX_NEXT=[HFN, SN]
  RX_DELIV=[HFN, SN]

In a second embodiment, the UE PDCP may set the value of RX_NEXT and/or RX_DELIV to the value of the COUNT of the first received PDCP PDU. For example, after MRB configuration, the UE may not initialize RX_NEXT and/or RX_DELIV. Upon receiving the first PDCP PDU for the MRB, the PDCP may determine the RCVD_COUNT=x, and set RX_NEXT=x and/or RX_DELIV=x. As a result, the receiving window may be set up upon reception of the first PDCP PDU.

In a third embodiment, the gNB may periodically send a control PDU which contains the value of RX_NEXT and/or RX_DELIV to use. UE PDCP would receive this control PDU and initialize or re-initialize RX_NEXT and/or RX_DELIV to the value contained in the control PDU. Alternatively, the gNB may periodically send a control PDU which contains the value of TX_NEXT. This could be either the value of the next PDCP PDU that may be transmitted or the value of the last PDCP PDU that was transmitted. Upon receiving the configuration, the UE may set up the variables based on the received configuration. Alternatively, the gNB may periodically send a control PDU which contains the value for HFN and SN. The UE may then determine the initial values of RX_NEXT and/or RX_DELIV based on the received HFN and SN.

In a fourth embodiment, each PDCP PDU transmitted by the gNB may include in its header, the value of TX_NEXT. The PDCP PDU may contain an indication that the PDCP PDU includes the value of TX_NEXT. This indication may allow the UE to know that the PDCP PDU header contains a first field identifying the SN of the PDCP SDU being transmitted and a second field containing the value of TX_NEXT. The UE would use the second field to (re) initialize RX NEXT and/or RX_DELIV. Alternatively, the gNB may include in its header, the values of HFN and SN associated with TX_NEXT. The UE may then determine the initial values of RX_NEXT and/or RX_DELIV based on the received HFN and SN.

In some cases, the above embodiments may be used in combination. The HFN part of the state variables may be determined by using one embodiment (for example configured by the gNB) and the SN part of the state variables may be determined by using another embodiment (for example based on the value of the COUNT of the first received PDCP PDU).

MRB with HARQ Feedback Enabled is described herein.

Some MRBs may have HARQ feedback enabled. For these MRBs, the UE may send ACK and/or NACK feedback to the gNB, depending on whether the transport block (TB) may be successfully decoded by the UE. Typically, if the MBS transmissions are using a PTM leg, these transmissions are destined to a number of UEs. For every transmission zero, one, or more of these UEs may fail to decode the TB. The UEs may send HARQ feedback to the gNB so that it may decide whether to send a retransmission, and if so, how to send this retransmission. Transport blocks are transmitted for a HARQ process, and the UE may be told when a new transmission begins for this HARQ process-via the New Data Indicator (NDI) carried in the PDCCH control signaling.

One specific problem occurs when HARQ feedback is enabled, and the UE starts receiving the transport blocks from the gNB from one or more HARQ processes. As the MRB may already be in operation, the UE may be unaware of the number of times the transport block has already been transmitted. For example, the gNB may have already transmitted the transport block K times, but when the UE starts to receive the MBS service, the UE has only received one of these, which it fails to decode. In such cases, the UE may continue to try to decode the subsequent received transport blocks for the HARQ processes, but it may decide not to send any HARQ feedback for these transport blocks. For example, consider the case that when a UE starts monitoring an MBS service, the gNB may be on the third transmission of a transport block. The UE may have just initiated listening, so it receives the third transmission but may not receive the first two transmissions. In such cases, it may be better to not have the UE send a NACK for this TB, as it may not be desired for the gNB to have to repeat it because this UE just started listening and has missed the first two transmissions. The UE may continue to decide not to send HARQ feedback for a given HARQ process until the UE receives an indication that the HARQ process has started a new transmission. At that point, the UE may send HARQ feedback for that HARQ process.

Figure 10:
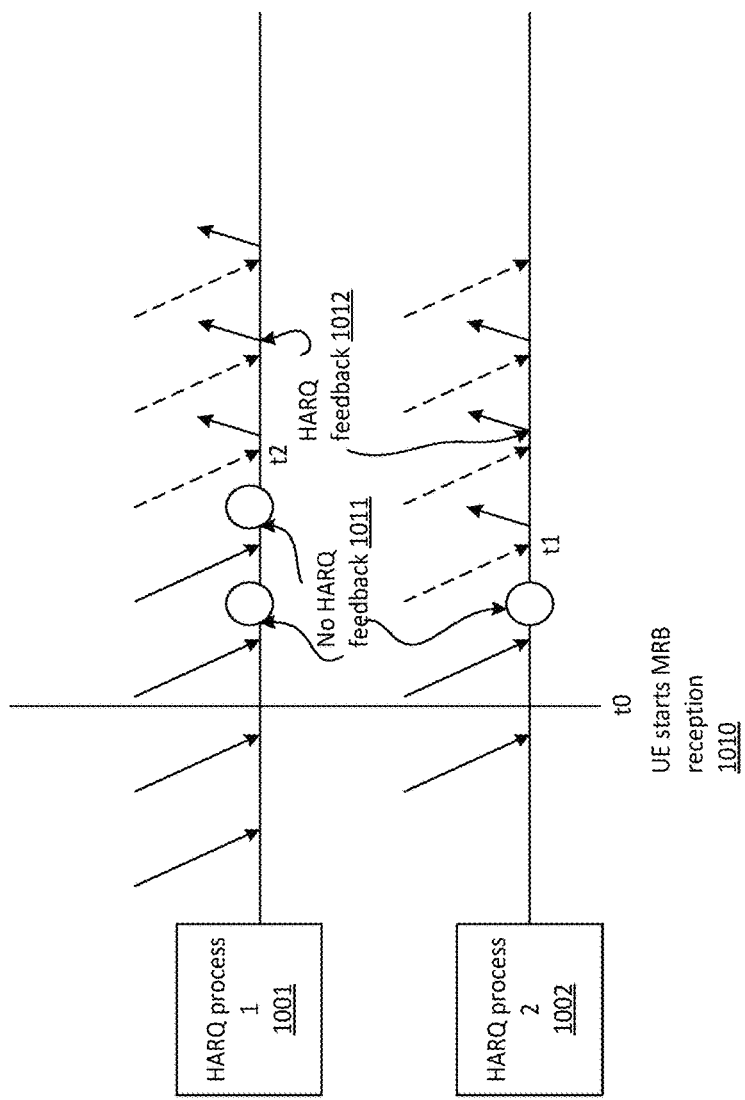
FIG. 10 shows an example of HARQ Feedback.

FIG. 10 show an example of a UE receiving MRBs 1000. In the example of FIG. 10, a UE may start MRB reception at time t0 1010. The UE may receive retransmissions for HARQ process 1 1001 but may not send any feedback 1011 to the gNB. At time t2, the UE may receive a new transmission, and begins to send HARQ feedback 1012.

In another example for HARQ operation, as the MBS traffic is destined for a group of interested UEs, the transport block may be transmitted multiple times to ensure that all interested UEs successfully receive the transport block. In such cases, it may be possible that a UE receives a transport block that it may have already decoded successfully. How the UE responds to these additional MBS HARQ retransmissions may not be defined in NR, and as a result, once a UE successfully decodes a transport block, it may send positive HARQ feedback for each subsequent retransmission of the transport block. This may lead to unnecessary uplink transmissions and may also lead to issues with the PUCCH resources carrying the MBS HARQ feedback. The following embodiments are proposed to resolve this issue.

In a first embodiment, the UE may decide not to send any HARQ feedback for a transport block if it has already successfully acknowledged reception of this transport block.

In a second embodiment, the UE may decide to send the HARQ feedback, but only up to a maximum number of times. The maximum number may be (pre) configured. For example, the UE may be (pre) configured to send a successful HARQ feedback indication up to a maximum of K times.

HARQ feedback issues and the HARQ process are described herein. When a transmission takes place for the HARQ process, one or two (in case of downlink spatial multiplexing) TBs and the associated HARQ information are received from the HARQ entity. The HARQ Process as described in clause 5.3.2.2 of the TS 38.321 specification is as follows:

For each received TB and associated HARQ information, the HARQ process shall:
1> If the HARQ process may be equal to an MBS HARQ process
2> if the NDI, when provided, has been toggled compared to the value of the previous received transmission corresponding to this TB:
3> consider this transmission to be a new MBS transmission.
2> If this is the very first received transmission for this TB (i.e. there is no previous NDI for this TB):
3> consider this transmission to be an initial MBS transmission.
2> else:
3> consider this transmission to be an MBS retransmission
1> else:
2> if the NDI, when provided, has been toggled compared to the value of the previous received transmission corresponding to this TB; or
2> if the HARQ process is equal to the broadcast process, and this is the first received transmission for the TB according to the system information schedule indicated by RRC; or
2> if this is the very first received transmission for this TB (i.e. there is no previous NDI for this TB):
3> consider this transmission to be a new transmission.
2> else:
3> consider this transmission to be a retransmission.

The MAC entity then shall:
1> if this is a new transmission or a new MBS transmission or an initial MBS transmission:
2> attempt to decode the received data.
1> else if this is a retransmission or a new MBS transmission or an initial MBS transmission:
2> if the data for this TB has not yet been successfully decoded:
3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if the HARQ process is equal to the broadcast process:
3> deliver the decoded MAC PDU to upper layers.
2> else if this is the first successful decoding of the data for this TB:
3> deliver the decoded MAC PDU to the disassembly and demultiplexing entity.
1> else:
2> instruct the physical layer to replace the data in the soft buffer for this TB with the data which the MAC entity attempted to decode.
1> if the HARQ process is associated with a transmission indicated with a Temporary C-RNTI and the Contention Resolution is not yet successful (see clause 5.1.5); or
1> if the HARQ process is associated with a transmission indicated with a MSGB-RNTI and the Random Access procedure is not yet successfully completed (see clause 5.1.4a); or
1> if the HARQ process is equal to the broadcast process; or
1> if the timeAlignmentTimer, associated with the TAG containing the Serving Cell on which the HARQ feedback is to be transmitted, is stopped or expired, or;
1> if the HARQ process is equal to an MBS HARQ process and this is not the first successful decoding of the data for this TB, or;
1> if the HARQ process is associated with an initial MBS transmission:
2> not instruct the physical layer to generate acknowledgement(s) of the data in this TB.
1> else:
2> instruct the physical layer to generate acknowledgement(s) of the data in this TB.

The MAC entity shall ignore NDI received in all downlink assignments on PDCCH for its Temporary C-RNTI when determining if NDI on PDCCH for its C-RNTI has been toggled compared to the value in the previous transmission.

NOTE: If the MAC entity receives a retransmission with a TB size different from the last TB size signaled for this TB, the UE behavior may be left up to UE implementation.

Procedures for a UE during transition from multicast ACTIVE to multicast INACTIVE are described herein, which provides solutions to Problem 6 described above. A UE may be interested in one or more multicast sessions. These multicast sessions may be multiplexed over one or more G-RNTI. In addition, these multicast sessions may alternate between two states: active and inactive.

An active multicast session may be an established multicast session in an active state. Multicast data may be transmitted to UEs that joined the multicast session. 5G core network resources for the multicast session are reserved.

Corresponding radio resources are reserved depending on participating UE locations. UEs that joined the multicast session are in the CM CONNECTED state. UEs may be allowed to join the multicast session (subject to an authorization check). For reception of an active multicast session, the UE may be in either the RRC Connected or RRC Inactive state.

An inactive multicast session may be an established multicast session in inactive state. No multicast data are transmitted. UEs that joined the multicast session may be in the CM CONNECTED or CM IDLE state. UEs may be allowed to join the multicast session (subject to authorization check). For an inactive multicast session, the UE may be in either RRC Connected, RRC Inactive state, or RRC Idle state.

While a UE is in the RRC Connected state or the RRC Inactive state, a multicast session may transition from active to inactive and vice versa. The UE may get an indication that the service has transitioned to active or inactive mode. It may be assumed in the following that the MTCH logical channels associated with the multicast session are being received over G-RNTI, while the control channel associated with the multicast session is being received over the same G-RNTI or over an SC-RNTI configured to carry the control information for the MBS session. This indication may be received using one or more of the following embodiments.

In a first embodiment, the UE may receive an RRC message that includes the MBS session that has transitioned to active or inactive mode. This may be carried in system information over a BCCH. In another example, this may be carried in MBS control signaling over an MCCH. In another example, this may be carried in dedicated signaling over DCCH, to all UEs receiving the MBS session.

In a second embodiment, the UE may receive a MAC CE that includes an index to the MBS session that has transitioned to active or inactive mode. The UE may be configured with an index value for each MBS session. The MAC CE may be included in a MAC PDU sent to the G-RNTI configured to carry the MBS session. Alternatively, the MAC CE may be included in a MAC PDU sent to SC-RNTI configured to carry the control information for the MBS session. Alternatively, the MAC CE may be included in a MAC PDU sent to a shared RNTI (SH-RNTI) configured to carry MBS control information for a group of MBS sessions (including the MBS session that may be transitioning to active or inactive mode) or for all MBS sessions.

In a third embodiment, the UE may receive a DCI that includes a bitmap that indicates the MBS session that has transitioned to active or inactive mode. The UE may be configured with an index value for each MBS session. For example, a "1" in bit position "k", may indicate that the MBS session with index "k" has transitioned to active or inactive mode. The DCI may be targeting the G-RNTI configured to carry the MBS session. Alternatively, the DCI may be targeting the SC-RNTI configured to carry the control information for the MBS session. Alternatively, the DCI may be targeting a shared RNTI (SH-RNTI) configured to carry MBS control information for a group of MBS sessions (including the MBS session that may be transitioning to active or inactive mode) or for all MBS sessions. Alternatively, the DCI may be targeting the C-RNTI of each of the UEs that may be interested in receiving the MBS session that may be transitioning to active or inactive mode.

It may be assumed that for an inactive multicast session, both the RRC Connected and RRC inactive UEs keep the MBS radio bearer configurations for the radio bearers that are going inactive. That is, for those MBS radio bearers that are part of the multicast session, the MBS radio bearers are not released. They may be thought of as suspended. Upon transition of a multicast session from active to inactive, the UE checks if it is receiving any other MBS sessions on the G-RNTI. If yes, then UE may:

Stop DRX for the MBS session, if DRX is configured per MBS session;
Perform RLC entity re-establishment for radio bearers of the inactive MBS session;
Suspend PDCP entity radio bearers of the inactive MBS session.

Upon transition of a multicast session from active to inactive, the UE may check if it is receiving any other MBS sessions on the G-RNTI. If no, then UE may:

Stop monitoring the G-RNTI and processing transport blocks received on the G-RNTI;
Stop DRX for the G-RNTI;
Perform RLC entity re-establishment for radio bearers of the inactive MBS session;
Suspend PDCP entity radio bearers of the inactive MBS session;
Clear HARQ processes associated with the G-RNTI (for example those HARQ processes that are recovering transport blocks whose destination may be the G-RNTI).

Upon transition of a multicast session from inactive to active, the UE may check if it is receiving any other MBS sessions on the G-RNTI. If yes, then UE may:

Start DRX for the MBS session, if DRX is configured per MBS session;
Resume PDCP entity radio bearers of the inactive MBS session.

Upon transition of a multicast session from active to inactive, the UE checks if it is receiving any other MBS sessions on the G-RNTI. If no, then UE may:

Start monitoring the G-RNTI. Follow the DRX configuration, if configured, for this G-RNTI;
Resume PDCP entity radio bearers of the inactive MBS session.

Although the above have been described for multicast sessions and transitions from active/inactive to inactive/active, these procedures may also be applied to broadcast sessions and transitions from start/stop to stop/start.

A UE that is receiving an active multicast session and that transitions to RRC Inactive state may perform one or more of the following.

First, the UE may obtain an indication whether a cell is broadcasting or multicasting an MBS session. Based on this indication, the UE may favor cell reselection to those cells transmitting the MBS session. This may be based on a priority of the MBS session.

Second, the UE may be configured to send an indication to the network if it detects a problem with the broadcast or multicast reception, while in RRC Inactive. For example, the UE may be configured with HARQ threshold and the UE may monitor the number of failed transport blocks. If the UE observes that the percentage of transport blocks that failed reception exceeds this threshold, it may send an indication to the network. As a second example, the UE may be configured with a minimum required receive level in the cell (e.g., min RSRP) or minimum required quality level in the cell (e.g., RSRQ). If the observed cell receive level or quality is below this threshold, the UE may send an indication to the network. It may send the indication while in RRC Inactive, or the UE may transition to RRC Connected to send this indication. Upon reception of this indication, the gNB may decide to take some action to assist the UE in receiving the MBS traffic. For example, modify the MCS, increase the transmit power, increase the number of blind HARQ retransmissions, etc.

Procedures for reliable transmissions when MBS is pre-empted are described herein, which provides solutions to Problem 7 described above. When there is a URLLC service request, whether in the scheduling period or in the middle of eMBB, mMTC, or MBS transmission, the gNB may transmit the URLLC packet immediately. In other words, to support the URLLC packet transmission, ongoing eMBB, mMTC, or MBS transmission packets may be stopped without notice.

Figure 11:
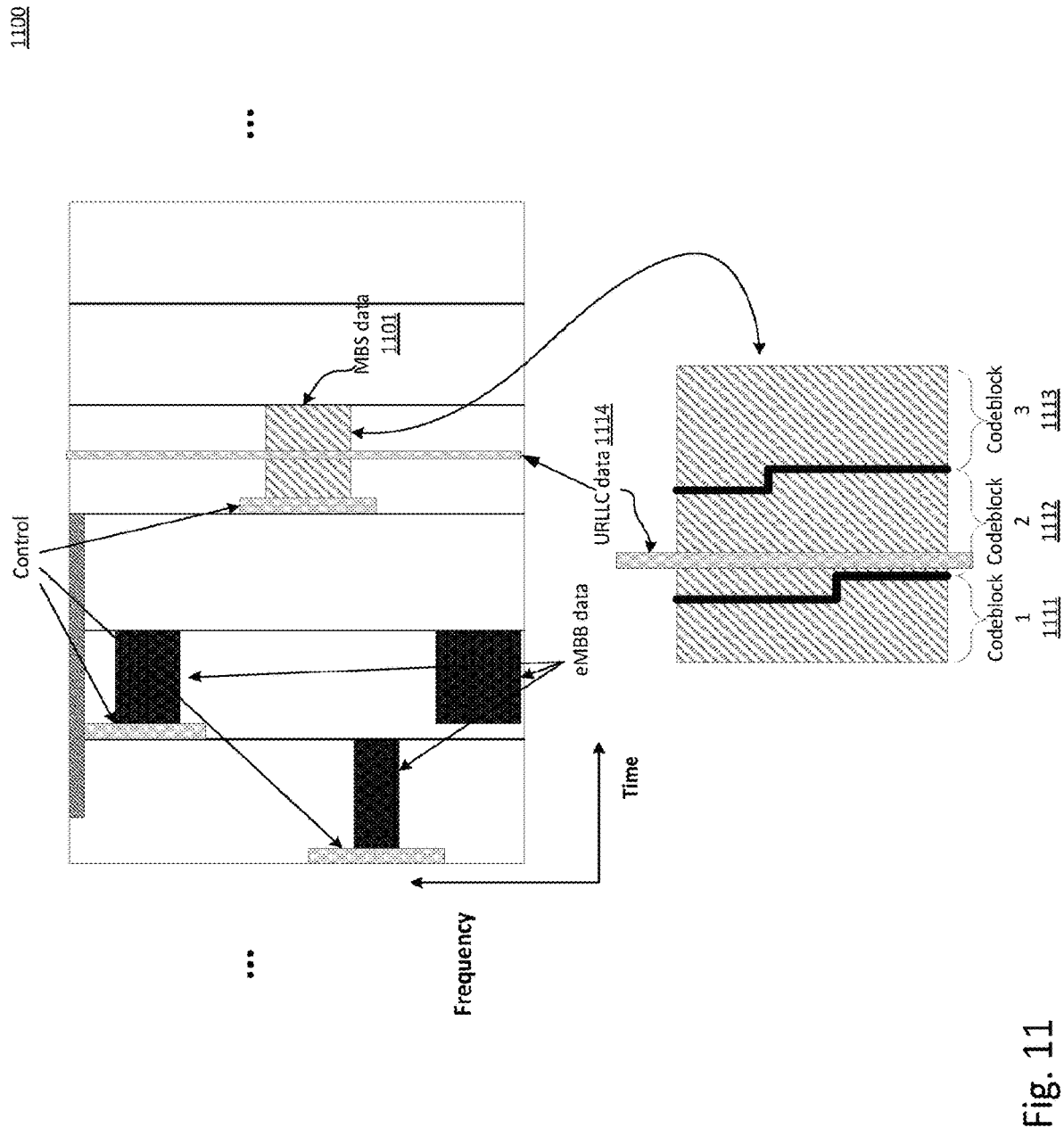
FIG. 11 shows an example of a pre-empted MBS transmission.

FIG. 11 shows an example transport block 1100. In the example of FIG. 11, when a TB (e.g., a TB comprising MBS data 1101) comprising of three codeblocks 1111, 1112, 1113 is transmitted for an MBS service, each codeblock 1111, 1112, 1113 may be mapped sequentially to the scheduled time-frequency resources. Thus, when the URLLC service is initiated in the middle of the MBS transport block 1101, part of the symbols in the second codeblock are replaced by the symbols of the URLLC packet 1114.

In another example, the transport block of an MBS transmission may be pre-empted by some higher priority transmission from the gNB. The UEs of the MBS group that are receiving the pre-empted transport block need to be notified of the pre-emption. The gNB may inform the UEs that a transmission has been pre-empted by using the INT-RNTI (pre-emption indication RNTI).

UEs in the MBS group may also monitor an INT-RNTI. If a new transmission is pre-empted, then clearly all UEs in the MBS group will fail to decode the transport block. If all UEs in the MBS group send HARQ feedback, this may lead to issues on the uplink. As the gNB may determine that the initial transmission will be NACKed, there may be no gain in having all the UEs in the MBS group send the HARQ feedback.

If a retransmission is pre-empted, some UEs in the MBS group may be able to decode the transport block. Using the example from FIG. 11, some UEs may be waiting to decode codeblock 1 1111 and may have already decoded codeblock 2 1112. As a result, the pre-emption of codeblock 2 1112 will not have an impact to these UEs.

A UE may determine whether to send HARQ feedback to a pre-empted transport block based on whether the transport block is a new transmission or a retransmission. If a new transmission, the UE may not send HARQ feedback to the pre-empted transport block. Alternatively, the UE may be configured to never send HARQ feedback for any pre-empted MBS transmission (regardless if MBS transmission is a new transmission or a retransmission). Alternatively, a UE may determine whether to send HARQ feedback to a pre-empted transport block based on an indication from the gNB. It is proposed that in the DCI scrambled with the INT-RNTI, the gNB may also include an indication if the UE should send feedback or not. For example, this could be a 1-bit field with '1' indicating that the UE may send feedback, and '0' indicating the UE should not send feedback.

DRX granularity for NR MBS is described herein, which provides solutions to Problem 8 described above. In the following, the term DRX MBS configuration is used to refer to the DRX configuration for MBS traffic in order to distinguish this from the DRX configuration used for unicast traffic. Similarly, the term MBS DRX operation is used to refer to the DRX related actions at a UE related to reception of MBS traffic. Similarly, to distinguish between the DRX timers for unicast traffic reception and MBS traffic reception, a qualifier is sometimes added to the timer name. For example, an MBS retransmission timer may refer to the retransmission timer for the MBS DRX operation.

The granularity of DRX for unicast transmission may be per UE for each DRX group, where a DRX group may be a group of Serving Cells. That is, the UE may have a single DRX configuration for each DRX group. For LTE eMBMS transmissions, the granularity of DRX may be per SC-MTCH (logical channel). However, LTE eMBMS only allows one service per SC-MTCH, and only maps one service per G-RNTI. Effectively, this results in the UE having the MBS DRX granularity per G-RNTI. For NR MBS, many MBS services may be mapped to a G-RNTI and be multiplexed in the same transport block. The MBS DRX granularity may be one or a combination of the following.

per MTCH logical channel: Each logical channel may have its own DRX configuration;

per MBS session: Each MBS session may have its own DRX configuration. In the case that an MBS session may be transmitted over multiple logical channels, the MBS DRX configuration would apply to each of these logical channels;

per group RNTI (G-RNTI): Each G-RNTI may have its own DRX configuration.

As the G-RNTI may multiplex multiple MTCH, the DRX configuration would be the same for each logical channel;

per group RNTI for MCCH (SC-RNTI): Each SC-RNTI may have its own DRX configuration.

In cases where the MBS DRX granularity may be defined per MTCH logical channel or per MBS session, the gNB may determine a single MBS DRX configuration for the G-RNTI. This single MBS DRX configuration based on the combined DRX requirements for the MTCH logical channels and MBS sessions multiplexed over the G-RNTI.

A UE may be configured with an MBS DRX configuration for each G-RNTI that it may be monitoring, an MBS DRX configuration for each SC-RNTI that it may be monitoring, as well as a unicast DRX configuration for each DRX group.

DRX configuration for NR MBS is described herein, which provides Solutions to Problem 9. The following DRX configuration parameters may be applied to MBS DRX:

drxMBS-onDurationTimer: the duration at the beginning of an MBS DRX Cycle;

drxMBS-SlotOffset: the delay before starting the drxMBS-onDurationTimer;

drxMBS-InactivityTimer: the duration after the PDCCH occasion in which a PDCCH indicates a new DL MBS transmission for the MAC entity;

drxMBS-RetransmissionTimerDL (per DL HARQ process): the maximum duration until a DL MBS retransmission may be received;

drxMBS-LongCycleStartOffset: the Long MBS DRX cycle and drxMBS-StartOffset which defines the subframe where the Long and Short MBS DRX Cycle starts;

drxMBS-ShortCycle (optional): the Short MBS DRX cycle;

drxMBS-ShortCycleTimer (optional): the duration the UE shall follow the Short MBS DRX cycle;

drxMBS-HARQ-RTT-TimerDL (per DL HARQ process): the minimum duration before a DL assignment for HARQ MBS retransmission may be expected by the MAC entity.

Separate MBS DRX configurations may be applied for each G-RNTI configured in the UE. Separate MBS DRX configurations may be applied for each SC-RNTI configured in the UE.

The MAC entity may be configured by RRC with an MBS DRX functionality that controls the UE's PDCCH monitoring activity for the MAC entity's G-RNTIs and SC-RNTIs. In case MBS transmission uses PTP scheme or PTM scheme 2, then the MBS DRX functionality also controls the UE's PDCCH monitoring activity for the MAC entity's C-RNTI. In addition, MBS DRX functionality may also control the UE's PDCCH monitoring activity for the MAC entity's INT-RNTI. When in RRC_CONNECTED, if MBS DRX is configured, for all the activated Serving Cells, the MAC entity may monitor the PDCCH discontinuously using the MBS DRX operation.

When an MBS DRX cycle is configured, the Active Time includes the time while:
- drxMBS-onDurationTimer or drxMBS-InactivityTimer configured for the G-RNTI or SC-RNTI or C-RNTI may be running; or
- drxMBS-RetransmissionTimerDL may be running.

UE DRX Procedures are described herein, which provides solutions to Problem 10. In the following examples, the description may be based on MBS transmission over the G-RNTI. It should be understood that this may to simplify the description and that the procedure may apply to any group RNTI used for MBS transmission. As a result, it may apply also to MBS transmission over SC-RNTI.

MBS transmission to a G-RNTI is to a group of UEs (referred to hereinafter as an MBS group). If the MBS DRX configuration is per G-RNTI, then each of the UEs in this MBS group have the same MBS DRX configuration. For MBS traffic, the gNB has various options for MBS HARQ transmissions and retransmissions, for example:

PTP scheme: For RRC_CONNECTED UEs, use UE-specific PDCCH with CRC scrambled by UE-specific RNTI (e.g., C-RNTI) to schedule UE-specific PDSCH which may be scrambled with the same UE-specific RNTI.

PTM scheme 1: For RRC_CONNECTED UEs in the same MBS group, use group-common PDCCH with CRC scrambled by group-common RNTI to schedule group-common PDSCH which may be scrambled with the same group-common RNTI. This scheme can also be called group-common PDCCH based group scheduling scheme.

PTM scheme 2: For RRC_CONNECTED UEs in the same MBS group, use UE-specific PDCCH with CRC scrambled by UE-specific RNTI (e.g., C-RNTI) to schedule group-common PDSCH which may be scrambled with group-common RNTI. This scheme can also be called UE-specific PDCCH based group scheduling scheme.

Furthermore, the UE may have the following options for HARQ feedback for multicast (the option used may be configured by the gNB):
- No HARQ feedback;
- ACK/NACK based HARQ-ACK feedback;
- NACK-only based HARQ-ACK feedback.

In order to take advantage of the DRX configuration, the gNB as well as all the UEs in the MBS group may be synchronized in terms of when to start and stop individual timers (including inactivity timer, HARQ RTT timer, as well as retransmission timer).

The inactivity timer may be started for each new MBS transmission received by a UE. The inactivity timer at a UE may be started:
- When the UE receives a DCI indicating a PTP scheme MBS transmission destined to the C-RNTI of UE;
- When the UE receives a DCI, indicating a PTM scheme 1 MBS transmission to the G-RNTI of the UE, which may be scrambled with group-common RNTI;
- When the UE receives a DCI, indicating a PTM scheme 2 MBS transmission to the G-RNTI of the UE, which may be scrambled by UE-specific RNTI (e.g., C-RNTI).

For PTM scheme 1 MBS transmission to the G-RNTI, it may be possible that because of MTCH channel multiplexing, the transport block does not contain any MTCH channels for MBS sessions of interest to the UE (hereinafter this may also be referred to as MTCH channels of interest). In such cases, the UE may stop the inactivity timer after decoding the transport block and determining that the transport block does not contain any MTCH channels of interest. Alternatively, for the PTM scheme 1 MBS transmission to the G-RNTI, the UE may be told how to manage the inactivity timer in cases the transport block does not contain any MTCH channels of interest. For example, the DCI scheduling the transport block may include a 1-bit indication telling the UE to stop the inactivity timer if the transport block does not contain any MTCH channels of interest. In another example, the MAC header may comprise an indication telling the UE to stop the inactivity timer if the transport block does not contain any MTCH channels of interest.

Figure 12:
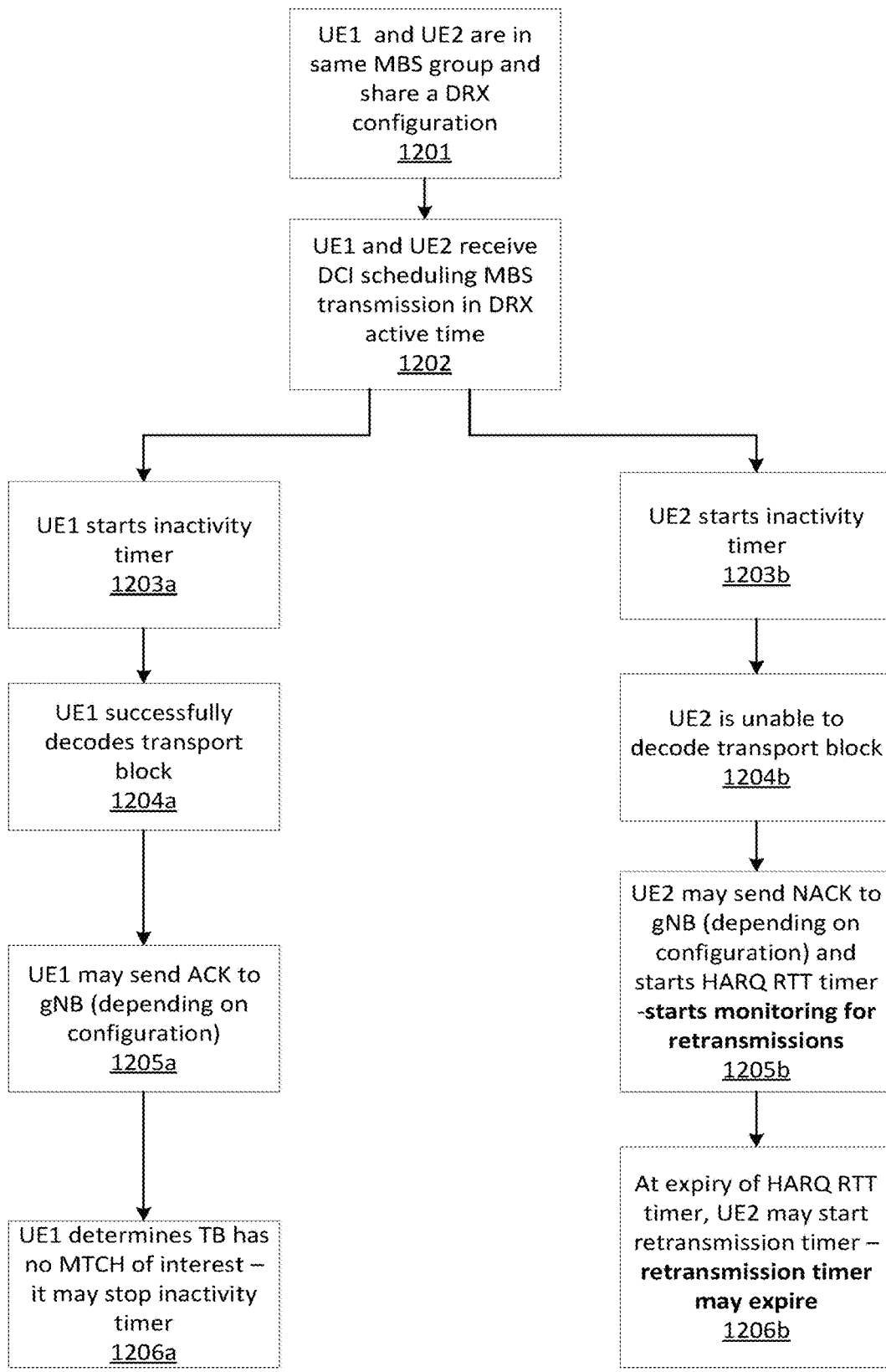
FIG. 12 shows an example of a HARQ RTT and Retransmission timer.

FIG. 12 shows the various example options for a UE 1200. It may be assumed that UE1 and UE2 are in the same MBS group and have the same DRX configuration for a G-RNTI.

Step 1201: UE1 and UE2 may be in same MBS group and share a DRX configuration.

Step 1202: During the MBS DRX active time of the DRX configuration, the UE1 and UE2 receive the DCI scheduling an MBS transmission. Depending on the transmission scheme (PTP scheme, PTM scheme 1, PTM scheme 2), the UE monitors one or more of C-RNTI, G-RNTIs, or SC-RNTIs configured for UE1 and UE2.

Step 1203*a*: UE1 may start the inactivity timer for this DRX configuration.

Step 1204*a*: UE1 may successfully decode the transport block.

Step 1205*a*: Depending on the HARQ feedback configuration, UE1 may send an ACK to the gNB.

Step 1206*a*: If UE1 determines that the transport block does not contain an MTCH of interest, then for PTM scheme 1, the UE1 may stop the inactivity timer.

Note that as an alternative to step 1205*a*, UE1 may send an ACK to the gNB only after decoding the transport block. If the transport block contains an MTCH of interest, UE1 may send an ACK to the gNB. If the transport block does not contain an MTCH of interest, UE1 may send an ACK to the gNB or some other indication to tell the gNB that the transport block was correctly received but not of interest to the UE1.

Step 1203*b*: UE2 may start the inactivity timer for this DRX configuration.

Step 1204*b*: UE2 may be unable to decode the transport block.

Step 1205*b*: Depending on the HARQ feedback configuration, UE2 may send a NACK to the gNB and start the HARQ RTT timer for this HARQ process.

Step 1206*b*: At expiry of the HARQ RTT timer, UE2 may start the retransmission timer.

A first issue to be addressed is what RNTI the UE monitors while the retransmission timer is running. The UE does not know the scheme used for the retransmission. In a first alternative, UE2 may monitor both C-RNTI and G-RNTI while the retransmission timer is running. In a second alternative, UE2 may monitor the C-RNTI or the G-RNTI while the retransmission timer is running. UE2 may make this determination based on configuration. For example, UE2 may be configured to know that retransmissions are using PTP scheme. Alternatively, UE2 may make this determination based on an indication in the initial transmission indicating how the gNB will send the retransmissions (if any retransmissions are required). For example, the initial transmission DCI may contain a 1-bit field indicating that retransmissions will be using PTM scheme 1. Note that this indication may also be included in the DCI scheduling each retransmission, to tell the UE how any subsequent or future retransmission will be sent. In a third alternative, UE2 monitors the C-RNTI in the unicast DRX active time. The gNB may ensure that it would send all DCI scheduling MBS retransmissions during the unicast DRX active time.

A second issue to be addressed may be related to the retransmission timer. Note that a single MBS transmission as described above, leads to potentially different actions at the UEs, depending on whether the transport block may be successfully decoded or not. Those UEs that have not successfully decoded the transport block expect retransmissions. These UEs may start a HARQ RTT timer. These UEs may also start a retransmission timer to receive the retransmissions. However, retransmissions are not expected for those UEs that have successfully decoded the transport block. These UEs would not start the HARQ RTT timer or the retransmission timer. Since not all UEs in the MBS group will start a retransmission timer, it has been proposed that the gNB may refrain from sending new transmissions when the retransmission timers are running, otherwise the UEs that have not started the retransmission timer may not be able to get these new transmissions. However, there may be a problem for those UEs that do start a retransmission timer. The gNB cannot use the time during which the retransmission timer may be running to schedule new transmissions. The gNB can only schedule retransmissions. The gNB may likely only schedule a certain number of retransmissions. After that, the gNB may likely try scheduling a new transmission. In such a case, if a UE sends a NACK for this last retransmission, it may trigger a retransmission timer, but no transmission may be forthcoming from the gNB. This may be a waste of a power saving opportunity. This triggered retransmission timer may expire, however, the behavior of the UE when the retransmission timer expires may not be specified. In order to avoid these two problems, it is proposed that the gNB may indicate if a transmission is the last transmission or last retransmission of a transport block. If so, and the UE fails to decode the transport block, then UE may decide to not start the HARQ RTT timer. UE may also decide to not start the retransmission timer. Alternatively, the UE behavior at the expiry of the retransmission timer may be specified. For example, at expiry of the retransmission timer, the UE may:
2> if the Short MBS DRX cycle may be configured:
3> start or restart drxMBS-ShortCycleTimer for this G-RNTI in the first symbol after the expiry of drxMBS-RetransmissionTimer;
3> use the Short MBS DRX Cycle for this G-RNTI.
2> else:
3> use the Long MBS DRX cycle for this G-RNTI.

What is claimed is:

1. A wireless transmit/receive unit (WTRU) comprising a processor and memory configured to:
receive Multicast/Broadcast Services (MBS) configuration information, the MBS configuration information comprising first MBS discontinuous reception (DRX) configuration information associated with a first group radio network temporary identifier (G-RNTI), second MBS DRX configuration information associated with a second G-RNTI, configuration information associated with at least a first MBS radio bearer (MRB), and an indication of one or more logical channels IDs (LCIDs) associated with the first MRB, wherein the configuration information associated with the first MRB comprises an initial value for a variable for determining packet data convergence protocol (PDCP) packets to be discarded, the first MBS DRX configuration information indicates values for a first MBS DRX on duration timer, a first MBS DRX slot offset, a first MBS DRX inactivity timer, a first MBS DRX cycle length, a first MBS DRX cycle start offset, a first MBS DRX downlink (DL) retransmission timer, and a first MBS DRX hybrid automatic repeat request (HARQ) round trip time (RTT) timer, and the second MBS DRX configuration information indicates values for a second MBS DRX on duration timer, a second MBS DRX slot offset, a second MBS DRX inactivity timer, a second MBS DRX cycle length, a second MBS DRX cycle start offset, a second MBS DRX DL retransmission timer, and a second MBS DRX HARQ RTT timer;
monitor for a physical downlink control channel (PDCCH) transmission using the first G-RNTI during a first DRX active time associated with the first MBS DRX configuration information, wherein the first active time comprises a time when the first MBS DRX on duration timer, the first MBS DRX inactivity timer, or the first MBS DRX DL retransmission timer is running;
monitor for a PDCCH transmission using the second G-RNTI during a second DRX active time associated with the second MBS DRX configuration information, wherein the second active time comprises a time when the second MBS DRX on duration timer, the second MBS DRX inactivity timer, or the second MBS DRX DL retransmission timer is running;
receive at least one PDCCH transmission using at least one of the first G-RNTI or the second G-RNTI;
decode a transport block based on the at least PDCCH transmission;
determine at least one medium access control (MAC) protocol data unit (PDU) from the transport block;
discard first data from the at least one MAC PDU that is associated with a LCID that is not one of the indicated one or more LCIDs; and
determine, based on the variable for determining PDCP packets to be discarded, whether to discard second data corresponding to a PDCP PDU that is from the at least one MAC PDU and that is associated with a LCID that is one of the indicated one or more LCIDs.

2. The WTRU of claim 1, wherein the MBS configuration information comprises a PDCP layer configuration.

3. The WTRU of claim 1, wherein the MBS configuration information comprises a medium access control (MAC) layer configuration.

4. The WTRU of claim 1, wherein the variable for determining PDCP packets to be discarded is RX_DELIV.

5. The WTRU of claim 4, wherein the determination of whether to discard the second data comprises a comparison between the RX_DELIV and a COUNT value.

6. The WTRU of claim 1, wherein the transport block comprises MBS traffic.

7. The WTRU of claim 6, wherein the MBS traffic comprises broadcast traffic, groupcast traffic, or unicast traffic.

8. The WTRU of claim 1, wherein the decoding of the transport block comprises demultiplexing the transport block at MAC layer.

9. The WTRU of claim 1, wherein the decoding of the transport block comprises disassembling the transport block at MAC layer.

10. The WTRU of claim 1, wherein the processor and memory is further configured to start the first MBS DRX DL retransmission timer or the second MBS DRX DL retransmission timer upon failing to decode the transport block.

11. A method comprising:
receiving Multicast/Broadcast Services (MBS) configuration information, the MBS configuration information comprising first MBS discontinuous reception (DRX) configuration information associated with a first group radio network temporary identifier (G-RNTI), second MBS DRX configuration information associated with a second G-RNTI, configuration information associated with at least a first MBS radio bearer (MRB), and an indication of one or more logical channels IDs (LCIDs) associated with the first MRB, wherein the configuration information associated with the first MRB comprises an initial value for a variable for determining packet data convergence protocol (PDCP) packets to be discarded, the first MBS DRX configuration information indicates values for a first MBS DRX on duration timer, a first MBS DRX slot offset, a first MBS DRX inactivity timer, a first MBS DRX cycle length, a first MBS DRX cycle start offset, a first MBS DRX downlink (DL) retransmission timer, and a first MBS DRX hybrid automatic repeat request (HARQ) round trip time (RTT) timer, and the second MBS DRX configuration information indicates values for a second MBS DRX on duration timer, a second MBS DRX slot offset, a second MBS DRX inactivity timer, a second MBS DRX cycle length, a second MBS DRX cycle start offset, a second MBS DRX DL retransmission timer, and a second MBS DRX HARQ RTT timer;
monitoring for a physical downlink control channel (PDCCH) transmission using the first G-RNTI during a first DRX active time associated with the first MBS DRX configuration information, wherein the first active time comprises a time when the first MBS DRX on duration timer, the first MBS DRX inactivity timer, or the first MBS DRX DL retransmission timer is running;
monitoring for a PDCCH transmission using the second G-RNTI during a second DRX active time associated with the second MBS DRX configuration information, wherein the second active time comprises a time when the second MBS DRX on duration timer, the second MBS DRX inactivity timer, or the second MBS DRX DL retransmission timer is running;
receiving at least one PDCCH transmission using at least one of the first G-RNTI or the second G-RNTI;
decoding a transport block based on the at least PDCCH transmission;
determining at least one medium access control (MAC) protocol data unit (PDU) from the transport block;
discarding first data from the at least one MAC PDU that is associated with a LCID that is not one of the indicated one or more LCIDs; and
determining, based on the variable for determining PDCP packets to be discarded, whether to discard second data corresponding to a PDCP PDU that is from the at least one MAC PDU and that is associated with a LCID that is one of the indicated one or more LCIDs.

12. The method of claim 11, wherein the MBS configuration information comprises a PDCP layer configuration.

13. The method of claim 11, wherein the MBS configuration information comprises a medium access control (MAC) layer configuration.

14. The method of claim 11, wherein the variable for determining PDCP packets to be discarded is RX_DELIV.

15. The method of claim 14, wherein the determination of whether to discard the second data comprises a comparison between the RX_DELIV and a COUNT value.

16. The method of claim 11, wherein the transport block comprises MBS traffic.

17. The method of claim 16, wherein the MBS traffic comprises broadcast traffic, groupcast traffic, or unicast traffic.

18. The method of claim 11, wherein the decoding of the transport block comprises demultiplexing the transport block at MAC layer.

19. The method of claim 11, wherein the decoding of the transport block comprises disassembling the transport block at MAC layer.

20. A wireless transmit/receive unit (WTRU) comprising a processor, memory, and a transceiver, the WTRU configured to:
receive Multicast/Broadcast Services (MBS) configuration information, the MBS configuration information comprising first MBS discontinuous reception (DRX) configuration information associated with a first group radio network temporary identifier (G-RNTI), second MBS DRX configuration information associated with a second G-RNTI, configuration information associated with at least a first MBS radio bearer (MRB), and an indication of one or more logical channels IDs (LCIDs) associated with the first MRB, wherein the configuration information associated with the first MRB comprises an initial value for a variable for determining packet data convergence protocol (PDCP) packets to be discarded, the first MBS DRX configuration information indicates values for a first MBS DRX on duration timer, a first MBS DRX slot offset, a first MBS DRX inactivity timer, a first MBS DRX cycle length, a first MBS DRX cycle start offset, a first MBS DRX downlink (DL) retransmission timer, and a first MBS DRX hybrid automatic repeat request (HARQ) round trip time (RTT) timer, and the second MBS DRX configuration information indicates values for a second MBS DRX on duration timer, a second MBS DRX slot offset, a second MBS DRX inactivity timer, a second MBS DRX cycle length, a second MBS DRX cycle start offset, a second MBS DRX DL retransmission timer, and a second MBS DRX HARQ RTT timer;
monitor for a physical downlink control channel (PDCCH) transmission using the first G-RNTI during a first DRX active time associated with the first MBS DRX configuration information, wherein the first active time comprises a time when the first MBS DRX on duration timer, the first MBS DRX inactivity timer, or the first MBS DRX DL retransmission timer is running;
monitor for a PDCCH transmission using the second G-RNTI during a second DRX active time associated with the second MBS DRX configuration information, wherein the second active time comprises a time when the second MBS DRX on duration timer, the second MBS DRX inactivity timer, or the second MBS DRX DL retransmission timer is running;
receive at least one PDCCH transmission using at least one of the first G-RNTI or the second G-RNTI;

decode a transport block to obtain a medium access control (MAC) protocol data unit (PDU) based on the at least one PDCCH transmission;
determine at least one medium access control (MAC) service data unit (SDU) of the MAC PDU;
discard the at least one MAC SDU that is associated with a LCID that is not one of the one or more LCIDs; and
determine, based on the variable for determining PDCP packets to be discarded, whether to discard a PDCP PDU that is from the MAC PDU and that is associated with a LCID that is one of the one or more LCIDs.

* * * * *